US008169926B2

(12) United States Patent
Kolze et al.

(10) Patent No.: US 8,169,926 B2
(45) Date of Patent: *May 1, 2012

(54) ENHANCED CHANNEL CHANGING WITHIN MULTI-CHANNEL COMMUNICATION SYSTEMS

(75) Inventors: Thomas J. Kolze, Phoenix, AZ (US); Bruce J. Currivan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1073 days.

This patent is subject to a terminal disclaimer.

(21) Appl. No.: 12/039,763

(22) Filed: Feb. 29, 2008

(65) Prior Publication Data

US 2009/0122846 A1 May 14, 2009

Related U.S. Application Data

(63) Continuation of application No. 10/739,312, filed on May 6, 2002, now Pat. No. 7,359,332.

(60) Provisional application No. 60/364,063, filed on Mar. 13, 2002.

(51) Int. Cl.
*H04J 3/26* (2006.01)
*H04L 12/42* (2006.01)
*H04N 7/173* (2006.01)

(52) U.S. Cl. ........ 370/252; 370/432; 370/437; 370/449; 370/462; 725/116; 725/120

(58) Field of Classification Search ........................ None
See application file for complete search history.

(56) References Cited

U.S. PATENT DOCUMENTS

| | | | |
|---|---|---|---|
| 6,510,162 B1 * | 1/2003 | Fijolek et al. | 370/432 |
| 6,742,187 B1 * | 5/2004 | Vogel | 725/126 |
| 6,845,106 B2 * | 1/2005 | McKinnon et al. | 370/477 |
| 6,891,858 B1 * | 5/2005 | Mahesh et al. | 370/480 |
| 7,089,580 B1 * | 8/2006 | Vogel et al. | 725/111 |
| 7,194,009 B2 * | 3/2007 | Eng | 370/480 |
| 7,269,159 B1 * | 9/2007 | Lai | 370/352 |
| 7,301,908 B2 * | 11/2007 | Carroll | 370/236 |
| 7,349,430 B1 * | 3/2008 | Chapman | 370/468 |
| 7,379,469 B2 * | 5/2008 | Hollums et al. | 370/419 |

* cited by examiner

*Primary Examiner* — Chi Pham
*Assistant Examiner* — Soon-Dong Hyun
(74) *Attorney, Agent, or Firm* — Garlick & Markison; Shayne X. Short

(57) ABSTRACT

Enhanced channel changing within multi-channel communication systems. A CMTS directs channel changing of a CM, sometimes between upstream data bursts. Logical channels, part of a single frequency channel, may be used, and the channel changing may be performed between those logical channels. Multiple upstream burst profiles and/or modulation densities may be used providing high degrees of robustness, fidelity, and throughput and allowing great channel flexibility. A CM may be switched between channels without losing transmitter capability. Even if some throughput rate may be sacrificed during the channel changing, the CM will still be able to continue data throughput. Then, the new channel may then undergo the initialization and ranging processes thereby enabling greater throughput on that new channel. After undergoing the initialization and ranging processes, the new channel will then be a fully equivalent member of the CM communication system.

20 Claims, 18 Drawing Sheets

US 8,169,926 B2

ENHANCED CHANNEL CHANGING WITHIN MULTI-CHANNEL COMMUNICATION SYSTEMS

CROSS REFERENCE TO RELATED PATENTS/PATENT APPLICATIONS

Continuation Priority Claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 10/139,312, entitled "Enhanced DOCSIS upstream channel changes,", filed May 6, 2002, pending, which claims priority pursuant to 35 U.S.C. §119(e) to the following U.S. Provisional Patent Application which is hereby incorporated herein by reference in its entirety and made part of the present U.S. Utility patent application for all purposes:

a. U.S. Provisional Application Ser. No. 60/364,063, entitled "Enhanced DOCSIS upstream channel changes,", filed Mar. 13, 2002, now expired.

BACKGROUND OF THE INVENTION

1. Technical Field of the Invention

The invention relates generally to communication systems; and, more particularly, it relates to cable modem communication systems.

2. Description of Related Art

Data communication systems have been under continual development for many years. Cable modem (CM) communication systems have been of particular interest in the past several years, given their operable bandwidth and data rates being significantly greater than many other forms of communication systems. This is particular in the case of Internet access for individual subscribers. A CM communication system typically involves communication between a CM and a cable modem termination system (CMTS). The upstream within the CM communication system often involves the changing of upstream communication (from CM to CMTS) from one channel to another. In a typical CM communication system employing the Data Over Cable Service Interface Specification (DOCSIS), the original channel has undergone already initialization and ranging processes to provide for optimal upstream communication performance on that particular channel.

Cable-based communications systems are used to carry many types of information, including video programming, voice services, data services, etc. Data services may themselves include video, audio, voice, and other real-time services as well as best-effort Internet Protocol (IP) services such as email, web surfing, and file transfer. DOCSIS is a commonly used standard for data communication in cable systems. DOCSIS is intended to guarantee interoperability among equipment from different vendors. It specifies the behavior of the cable data communication system and its parts on a number of levels. It includes system and plant architecture requirements; physical-layer specifications covering the transmission of physical signals on the cable plant, including frequency plan, modulation, coding, fidelity requirements, etc.; Medium Access Control (MAC) layer specifications covering the format, timing, and management of data transmissions, including packet formats, management messaging, error handling, et al.; and specifications for interfaces in areas such as connection of a users' computer, connection of headend equipment to other networks (e.g. a WAN or the Internet), network management functionality, et al.

In a DOCSIS system, a single Cable Modem Termination System (CMTS) acts as a supervisory node. One or more Cable Modems (CMs) act as client nodes. The CMTS generally resides at a cable headend or other operator site, while the CMs reside at the customer premises. The CMTS transmits downstream data traffic in a broadcast manner, i.e. so that it is received by all CMs. Besides data associated with services being provided, this downstream data also includes various kinds of management messages that provide the CMs with MAC information such as when the CM is allowed to transmit, what physical layer parameters it must use, etc. The CM will use this information to transmit upstream data to the CMTS in a point-to-point fashion, i.e. only the CMTS can "hear" the transmissions of the CM. The CMTS manages the CMs in such a way as to guarantee that no CM's transmissions will interfere with those of another CM so that each CM's transmissions may be properly received (except in designated regions, known as "contention" regions, in which multiple CMs are allowed to transmit and may collide with each other). To guarantee this, DOCSIS provides for separation of CM transmissions in time, in frequency, or in codes.

As one tool for separating CM transmission, DOCSIS includes a construct called a channel. A channel is defined by an Upstream Channel Descriptor (UCD) message, a type of MAC-layer management message which is sent downstream by the CMTS to all CMs. A UCD includes a Channel ID (which is an arbitrary 8-bit identifier for the channel) and a number of parameters which define the physical-layer associated with a channel (e.g. center frequency, methods of coding, preamble length, etc.). In a given system, the CMTS may have any number of channels active; for each channel, it periodically sends a UCD message describing that channel. A particular CM will either choose a specific channel to operate on or be instructed by the CMTS to operate on a specific channel. Typically, a channel will have a large number (tens to hundreds) of CMs operating on it at the same time. All CMs on a single channel must use the same physical layer parameters, as specified by the UCD message.

In versions of DOCSIS prior to 2.0, the frequency plan of the various active channels is organized such that channels operating on the same physical segment of the cable plant used different center frequencies chosen such that there is little or no spectral overlap between channels, thus providing separation in frequency of groups of CMs. Within each channel, the CMTS then schedules the upstream transmissions of the various CMs in a Time Division Multiple Access (TDMA) fashion so that each CM received the desired number and frequency of transmit opportunities with no overlap between CMs (except for contention regions open to multiple CMs). The CMTS transmits a MAC layer management message known as an Upstream Bandwidth Allocation message, or MAP message, to indicate to the CMs the allocation of time slots on a particular channel.

A MAP message defines the use to which each time slot may be put on a particular channel. Separate MAP messages are sent for each channel. The MAP messages for a channel contain a Channel ID field matching that of the UCD messages for that same channel. A MAP message generally also includes information about time slots on the channel. This information includes: the slot's start time; its duration; the CM or CMs which are allowed to use that slot; and the type of transmission it or they may use the slot for. Transmission type is specified by an Interval Usage Code (IUC). Each IUC has a designated purpose, e.g. for requests, for long data transmissions, for short data transmissions, for maintenance activities, et al. When the MAP indicates that a particular CM may use a given time slot, the CM may transmit a burst of the specified type during that time slot. A burst is defined by the period during which the CMs transmitter is on. The CMs transmitter must be off during any timeslot in which the CMTS has not specifically given that CM (or a group of CMs to which it belongs) permission to transmit.

DOCSIS 2.0 adds new tools for separating the transmissions of the various CMs. One such tool is Synchronous Code Division Multiple Access (S-CDMA). With S-CDMA, transmissions from various CMs are still scheduled in time; however, at a given time, more than one CM may be physically transmitting using a particular set of codes. The codes chosen are orthogonal so that each CMs transmission may be independently recovered at the receiver, providing for separation and management of CM transmissions via codes.

DOCSIS 2.0 also introduces the concept of a "logical channel." In contrast with DOCSIS 1.1, where each channel on a single physical plant segment must use a different center frequency, DOCSIS 2.0 allows the coexistence of multiple "logical channels" using the same spectrum on the same physical plant segment. Each logical channel is described by its own UCD message; this allows CMs on different logical channels to use different physical layer parameters (although all CMs on the same logical channel must use the same physical layer parameters). To prevent these logical channels from interfering with each other, the CMTS schedules the various logical channels using a particular spectrum for different time slots, so that at any given time only one such logical channel is transmitting, while the others are scheduled for idle slots during this time. Thus, the CMTS manages these logical channels in such a way as to separate them in time. The term "physical channel" is sometimes used to refer to the particular part of the available spectrum which is being shared among logical channels, while the term "logical channel" is used to refer to one of the channels as described by a UCD message which occupies the spectrum of the physical channel. The coexistence of multiple logical channels within a physical "channel" is completely transparent to the CM; thus, the concept of a "logical channel" is only meaningful at the CMTS, where the sharing of spectrum is visible. The CM behaves as instructed by the CMTS via the UCD and MAP messages for the channel, which contain no information about spectral sharing, and therefore the term "channel" (not "logical channel") is applicable at the CM.

A UCD message defines a channel. In order to operate on a channel, a CM must receive a UCD message describing that channel. A UCD message contains two types of physical layer parameters: channel-wide parameters, which are used for all transmissions on the channel, regardless of burst type; and burst-specific parameters, which may be different for different types of bursts (i.e. for different IUCs). Examples of channel-wide parameters are center frequency, coding type (S-CDMA or TDMA), preamble pattern, et al. Examples of burst-specific parameters are modulation order (e.g. QPSK, 16QAM, 64QAM, and et al.), forward error correction (FEC) codeword size, number of FEC parity bytes, byte interleaver matrix size, et al. Burst-specific parameters are typically chosen so as to maximize the efficiency of each burst type; for example, a short data grant burst type may be specified to use a relatively short FEC codeword size to provide a reasonable level of error correction ability, but such codeword sizes would be very inefficient for a long data grant burst type and thus this type may use a relatively long FEC codeword size instead. The set of burst-specific parameters for all allowed burst types is known as the set of "burst profiles" for that channel. Burst profiles are properties of a channel; thus, all modems on a channel must use the same set of burst profiles. Thus, although long data bursts may use different parameters than short data bursts, a modem on a given channel must use the same parameters for transmitting short data bursts as all other modems on a given channel. Burst profiles may be chosen to balance any of a number of considerations, such as efficiency, robustness in the presence of certain types of noise, etc.

DOCSIS specifies that UCD messages containing the descriptions of the upstream channels in the system be sent periodically by the CMTS. In general, the periodic UCD messages describing a particular channel are always the same (they must be sent periodically to provide information about the channel to new CMs attempting to join the network). Thus, once established, the parameters of a particular channel (as described by a UCD message with a particular Channel ID) do not change. If the CMTS wishes to change the parameters of a channel (perform a "UCD change"), it must follow strict rules regarding notification of CMs of the upcoming change, timing of the change, and coordination of the change with MAP messages on the channel. A UCD change affects all CMs currently on the channel; i.e., all CMs on the channel must begin using the new parameters at the specified time.

When a CM first joins the network, it chooses a particular upstream channel on which to operate (or is instructed by the CMTS to operate on a particular upstream channel) and performs an initialization process. This initialization process includes a step known as ranging, whereby the CM and CMTS cooperate to determine what timing offsets the CM must apply to its transmission (based on the distance between CM and CMTS), what transmit pre-equalizer coefficients (if any) the CM must use when transmitting (based on the physical characteristics of the channel in use), and possibly other parameters individual to this CM. Once this ranging process is complete, the CM can transmit upstream data in a manner which will not interfere with other CMs and will be properly received at the CMTS. The initialization process may include other steps as well (e.g. authentication, registration on the network, etc.). When initialization is complete, the CMTS will allow the CM to pass data traffic on the channel. This data traffic may include best-effort services such as email or web traffic, and it may also include real time services such as voice (e.g., using VoIP [Voice over Internet Protocol]), video, audio, two-way video- or audio-conferencing, etc.

Sometimes it is desirable for the CMTS to instruct a particular CM to move from one channel to another. This may be done for a number of purposes. The operator may wish to perform "load balancing" by moving CMs from a heavily loaded channel onto a lightly loaded one. Or the operator may wish to perform system maintenance, perhaps involving the swapping or upgrading of headend equipment, which requires that a particular card, shelf, cabling segment, etc. be free of traffic. At the time the operator wishes to move a CM from one channel to another, the CM may or may not be actively passing traffic. In general, it is not possible to make channel changes only on CMs which are not actively passing traffic. This is particularly true in a system which provides real-time services, when a session (e.g. a phone call) may be in progress at the time the channel change is desired.

DOCSIS provides a mechanism called Dynamic Channel Change (DCC) for the purpose of moving a single CM from one channel to another. The messaging involved in this process is complex and affects many layers of the system. The process may be briefly summarized by the following steps: (1) CMTS instructs CM to change channels, and optionally provides the UCD parameters of the "new" channel and/or specifies which portions of the normal initialization process must be performed by the CM after it switches channels and before beginning to pass traffic on the new channel; (2) CM acknowledges receiving the channel change instruction; (3) CM stops transmitting on the old channel; (5) CM switches to the new channel and performs whatever initialization steps were specified by the CMTS; (6) CM begins transmitting on the new channel.

A problem with the current state of the art lies in the initialization steps. These steps must be performed in order for the CM to transmit successfully on the new channel without interfering with other CMs' transmissions, and may take several seconds or more to complete. During this initialization period, the CM is unable to transmit normal data traffic. If the CM is carrying real-time services, the gap in transmission due to initialization on the new channel may result in complete loss of the real-time connection (e.g. dropping of the phone call). This behavior is unacceptable in a modern communications system. Even if the gap is short enough that the connection is not dropped, it may result in lost packets and/or jitter on the periodicity of the packets, either or both of which could cause unacceptable degradation of the quality of the connection.

DOCSIS allows for the possibility of reducing the delay due to re-initialization on a new channel by allowing the CMTS to specify which initialization steps, if any, must be taken by the CM when it moves to the new channel. However, in many cases it may not be physically possible to omit certain initialization steps. For example, if a CM is instructed to move to a new channel with a substantially different center frequency, the transmit pre-equalizer coefficients needed by the CM to operate on this new channel may be very different from those which were used on the old channel, and thus a process of ranging is required to determine these coefficients before the CM can successfully transmit on the new channel. Similarly, the new channel may use burst profiles which are chosen for maximum efficiency (e.g. high order modulation, little FEC) but require great precision in transmit timing and/or equalization; this precision may not be physically achievable without a process of ranging and its inherent delay. Because of the physically necessity of re-initialization, there may be very few to zero combinations of channels between which a CM may perform a DCC while carrying real-time traffic without unacceptably degrading or dropping the real-time connection. This places a serious limitation on operators who wish to support such services.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

Various aspects of the invention can be found in a CM communication system that is operable to perform upstream channel changes that are sometimes performed, without disrupting upstream data transmissions. The present invention is operable to enable channel changing for upstream data bursts (from a CM to a CMTS) within a CM communication system. The present invention provides for ensuring operation on the new channel in a very robust manner, thereby guaranteeing proper operation during the upstream data bursting. The present invention then enables continued transmission following the channel changing. This may involve changing from one channel to another channel with a substantially similar center frequency. In some embodiments, a number of logical channels are used in a single frequency channel, or frequency band, the channel changing may be performed between those logical channels. A variety of upstream burst profiles and/or modulation densities may be employed thereby providing a high degree of robustness, fidelity, and throughput while that allows multiple programmable flexibilities on each channel. If desired, the number of available upstream burst profiles and/or modulation densities may be selectable and programmable by a designer of the CM communication system.

A CM may be switched from one channel to another, more efficiently, minimizing interruption, and thus maintaining data flows and not disrupting data transmission. Some throughput rate may be sacrificed, by switching to a lower order upstream burst profile and/or lower order modulation density, yet the CM will be able to continue data throughput. Then, after meeting some condition, the new channel, to which the CM has been switched, may then undergo the initialization and ranging processes thereby enabling greater throughput on that new channel. After undergoing the initialization and ranging processes, the new channel will then be a fully equivalent member of the CM communication system.

DETAILED DESCRIPTION OF THE INVENTION

Figure 1:
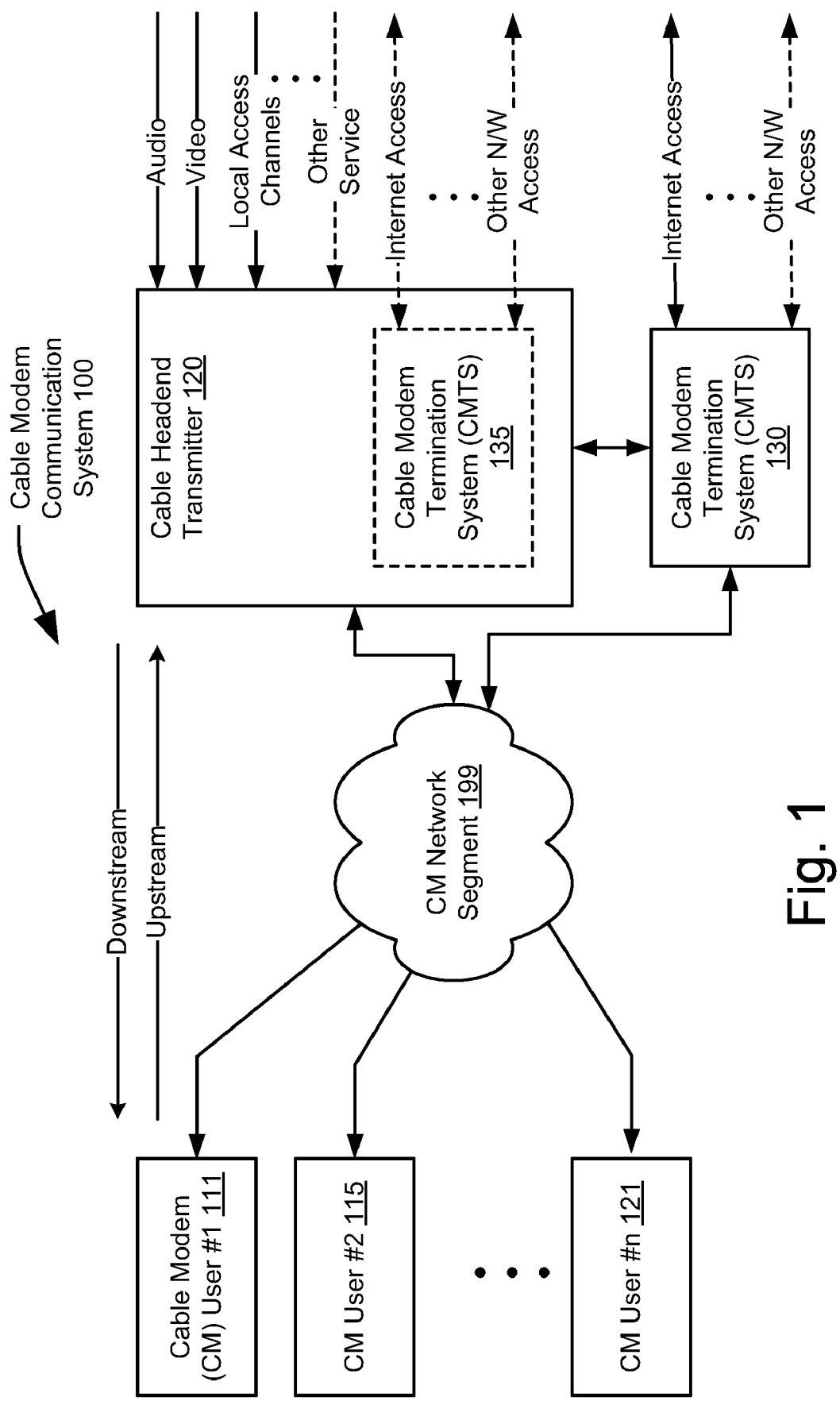
FIG. 1 is a system diagram illustrating an embodiment of a CM communication system that is built according to the present invention.

The present invention seeks to address the deficiencies of the prior art by providing methods for performing channel changes while maintaining acceptable quality of real-time services (ideally, zero jitter and zero packet loss). The present invention does this by providing an intermediate channel (or channels) as a "stepping stone" between the channel the CM is currently operating on and the channel on which it is ultimately desired that the CM operate. This allows the CM to perform the channel change in relatively small steps, each of which may be taken without the need for an immediate re-initialization process. Once the CM has been moved to such an intermediate channel, the CMTS may provide it with a maintenance opportunity at a convenient time, during which adjustments may be made to the CM's timing offset, transmit pre-equalizer coefficients, et al. These adjustments bring the CM's operating parameters closer to those needed for successful operation on the ultimate destination channel. After the adjustments are made, the CM is then able to take the next step, again without the need for an immediate ranging or other initialization process.

The present invention is described in the context of a DOCSIS system. However, the concept may apply to other systems using other protocols.

The present invention is operable to enable channel changing without disrupting upstream data transmissions (from a CM to a CMTS) within a CM communication system. A CM may be switched from one channel to another, more efficiently, minimizing interruption, and thus maintaining data flows and not disrupting data transmission. The present invention provides for ensuring operation on the new channel in a very robust manner, thereby guaranteeing proper operation for the upstream data burst. The present invention then enables continued transmission during the channel changing. This may involve changing from one channel to another channel with a substantially similar center frequency. In some embodiments, a number of logical channels are used in a single frequency channel, or frequency band, the channel changing may be performed between those logical channels. A variety of upstream burst profiles and/or modulation densities may be employed thereby providing a high degree of robustness, fidelity, and throughput while that allows multiple programmable flexibilities on each channel. If desired, the number of available upstream burst profiles and/or modulation densities may be selectable and programmable by a designer of the CM communication system.

A CM may be switched from one channel to another without forcing the CM to lose its transmitter capability. Some throughput rate may be sacrificed, by switching to a lower order upstream burst profile and/or lower order modulation density, yet the CM will be able to continue data throughput. Then, after meeting some condition, the new channel to which the CM has been switched, may then undergo the initialization and ranging processes thereby enabling greater throughput on that new channel. The optimal transmitter equalizer taps may be calculated when performing the ranging process. After undergoing the initialization and ranging processes, the new channel will then be a fully equivalent member of the CM communication system.

The operation of the present invention may also be described as follows: sometimes, the CMTS orders a CM to switch channels between upstream data bursts. While within prior art systems, this may not even be possible (given the requirements of undergoing the initialization and ranging processes); this may result in significantly reduced performance. The data in the next upstream data burst may be lost altogether, while the new channel must undergo similar initialization and ranging processes before beginning an upstream data burst on that new channel.

In the prior art approach, there would be no knowledge of the integrity of a new channel to which the CM is to change. There would be no knowledge of how corrupted that new channel may in fact be. Some designs of upcoming versions of DOCSIS have arrived at the conclusion that channel changing between upstream data bursts is too onerous on the communication system's resources and/or is simply not feasible. However, the present invention enables channel changing between upstream data bursts. In addition, channel changing may be performed between upstream data bursts without having to undergo the initialization and ranging processes immediately. The upstream data burst may begin and the data throughput may be continued without undergoing these initialization and ranging processes, and they may be performed later on when there are available processing resources within the CM communication system.

In certain embodiments, a second channel (or multiple channels) that may be viewed as being a "dual" channel at (nearly) the same center frequency as a primary channel may be maintained in order to increase the number of burst profiles available over that frequency range. This supports a Dynamic Channel Change (DCC), and may be performed at the CMTS within the CM communication system. The present invention provides a solution that is backwards compatible with DOCSIS 1.0 and 1.1 compatible CMs.

In one embodiment, the upstream data burst on the new channel is initially performed using a relatively low order upstream burst profile and/or lower order modulation density thereby enabling the CM to continue data throughput to the CMTS. For example, the low order upstream burst profile and/or lower order modulation density may involve employing Quadrature Phase Shift Keying (QPSK) thereby providing a high degree of robustness. There can be relatively high confidence that the new channel will be able to support QPSK. Afterwards, when possible, the new channel may undergo initialization and ranging and a higher order upstream burst profile and/or higher order modulation density may be employed to provide a higher degree of throughput. For example, the higher order upstream burst profile and/or lower order modulation density may involve employing QAM (Quadrature Amplitude Modulation) of various higher orders, such as 16 QAM, 64 QAM, 256 QAM, and 1024 QAM.

Some proposed DOCSIS solutions employ only QPSK and 16 QAM; in such CM communication systems, the use of the lower order and higher order modulation densities may involve switching between QPSK and 16 QAM. For example, the present invention may start out with QPSK on the new channel for an individual CM. This may permit operation without using ideal equalizer taps on that new channel. While this may result in lower throughput for that CM, a call at least won't be dropped. After some period (as determined when some predetermined conditions are met), station maintenance may be performed that may involve performing initialization and ranging processes, calculating better equalizer taps, and/or changing to higher order modulation densities. This will perform well for Time Division Multiple Access (TDMA) and also presents a much simpler solution when compared to prior art approaches. In addition, a lower order upstream data burst profile, that involves a QPSK modulation density, may be initially employed on the new channel. All short grants on the new channel may be constrained to be upstream data burst profile that employs the QPSK modulation density.

The following example may illustrate the operation of the present invention on one embodiment. There is a CHA (channel A) that operates at center frequency of substantially 20 MHz, with its burst profiles. These burst profiles are perhaps high density constellations with limited Forward Error Correction (FEC, a receiver technique for correcting errors in the received data) for the most part. This would perhaps include a relatively clean communication channel. In addition, there is another CHB (channel B) that has also has a center frequency of substantially 20 MHz. However, the CHB has an entirely new set of burst profiles at its disposal. The burst profiles for the CHB may be relatively low density constellations, with long preambles, lots of guard time, lots of FEC, and other encoding employed within relatively lower order burst profiles.

A CM that changes channels to 20 MHz would first go to CHB. Then, the CM would get some synchronization and equalizer (EQ) updates while operating here, and eventually the CM would be able to "move" to CHA. This may be viewed as enabling the more efficient burst profiles. From certain perspectives, a medium access controller (MAC) is able to support this functionality. There are some scheduler considerations here as well. It is also noted that the channels A and B cannot hand out grants for the same time slots.

The availability of a second channel, to increase the number of burst profiles, for example to provide ultra-robust profiles, does not mean that any CMs need necessarily ever use this channel. The CMTS does not have to waste capacity (in the form of upstream time slots) just because of the existence of this second set of burst profiles corresponding to the second channel. All channels could be viewed as having these dual-universe, ultra-robust profiles/second channels available for use. When it is time to change a modem (execute a DCC) then one of these pre-existing, robust, alternate universe channels would be the transition channel. There may be several CMs that are moving, so it could be more than one CM being placed into a transitory channel, but maybe not a lot of CMs.

Since this is just a transitory channel, it need not be in use for a period of time under this approach. The throughput capacity losses would be only for a limited period of time; this would not be unlike a throughput loss from just having a modem drop back to a lesser efficient burst profile. Moreover, using less efficient burst profiles for a CM impacts the entire networks' overall efficiency, for that matter.

FIG. 1 is a system diagram illustrating an embodiment of a CM communication system 100 that is built according to the present invention. The CM communication system includes a number of CMs (shown as a CM user #1 111, a CM user #2 115, and a CM user #n 121) and a CMTS 120. The CMTS 130 is a component that exchanges digital signals with CMs on a cable network.

Each of a number of CM users, shown as the CM user #1 111, the CM user #2 115, . . . , and the CM user #n 121, is able to communicatively couple to a CM network segment 199. A number of elements may be included within the CM network segment 199, as understood by those persons having skill in the art. For example, routers, splitters, couplers, relays, and amplifiers may be contained within the CM network segment 199 without departing from the scope and spirit of the invention.

The CM network segment 199 allows communicative coupling between a CM user and a cable headend transmitter 120 and/or a CMTS 130. In some embodiments, the cable headend transmitter 120 is in fact contained within the CMTS 130. In other embodiments, the cable headend transmitter 120 is located externally to the CMTS 130. The CMTS 130 may be located at a local office of a cable television company or at another location within a CM communication system. For example, the CMTS 130 may be located externally to a cable headend transmitter 120. In alternative embodiments, a CMTS 135 may be located within the cable headend transmitter 120. In the following description, the CMTS 130 is used for illustration; yet, those persons having skill in the art will appreciate that the same functionality and capability as described for the CMTS 130 may equally apply to embodiments that alternatively employ the CMTS 135. The cable headend transmitter 120 is able to provide a number of services including those of audio, video, local access channels, as well as any other service known in the art of cable systems. Each of these services may be provided to the one or more CM users 111, 115, . . . , and 121.

In addition, through the CMTS 130, the CM users 111, 115, . . . , 121 are able to transmit and receive data from the Internet, . . . , and/or any other network to which the CMTS 130 is communicatively coupled. The operation of a CMTS, at the cable-provider's head-end, may be viewed as providing many of the same functions provided by a digital subscriber line access multiplexor (DSLAM) within a digital subscriber line (DSL) system. The CMTS 130 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users, and typically control servers for a protocol called Data Over Cable Service Interface Specifications (DOCSIS), the major standard used by U.S. cable systems in providing Internet access to users.

The downstream information flows to all of the connected CM users 111, 115, 121; this may be viewed to be in a manner that is similar to that manner within an Ethernet network. The individual network connection, within the CM network segment 199, decides whether a particular block of data is intended for it or not. On the upstream side, information is sent from the CM users 111, 115, . . . , 121 to the CMTS 130; on this upstream transmission, the users within the CM users 111, 115, . . . , 121 to whom the data is not intended do not see that data at all. As an example of the capabilities provided by a CMTS, the CMTS will enable as many as 1,000 users to connect to the Internet through a single 6 MHz channel. Since a single channel is capable of 30-40 megabits per second of total throughput, this means that users may see far better performance than is available with standard dial-up modems. Embodiments implementing the present invention are described below and in the various Figures that show the data handling and control within one or both of a CM and a CMTS within a CM system that operates by employing SCDMA.

The CMs of the CM users 111, 115, . . . , 121 and the CMTS 130 communicate synchronization information to one another to ensure proper alignment of transmission from the CM users 111, 115, . . . , 121 to the CMTS 130. This is where the synchronization of the SCDMA communication systems is extremely important. When a number of the CMs all transmit their signals at a same time such that these signals are received at the CMTS 130 on the same frequency and at the same time, they must all be able to be properly de-spread and decoded for proper signal processing.

Each of the CMs users 111, 115, . . . , 121 is located a respective transmit distance from the CMTS 130. In order to achieve optimum spreading diversity and orthogonality for the CMs users 111, 115, . . . , 121 to transmission of the CMTS 130, each of the CM transmissions must be synchronized so that it arrives, from the perspective of the CMTS 130, synchronous with other CM transmissions. In order to achieve this goal, for a particular transmission cycle, each of the CMs 111, 115, . . . , 121 will typically transmit to the CMTS 130 at a respective transmission time, which will likely differ from the transmission times of other CMs. These differing transmission times will be based upon the relative transmission distance between the CM and the CMTS 130. These operations may be supported by the determination of the round trip delays (RTPs) between the CMTS 130 and each supported CM. With these RTPs determined, the CMs may then determine at what point to transmit their SCDMA data so that all CM transmissions will arrive synchronously at the CMTS 130.

The present invention enables channel changing for each of the CM users (CMs users 111, 115, . . . , 121) when performing upstream data bursts to the CMTS 130. All of the functionality described herein this patent application may be performed within the context of the CM communication system of the FIG. 1. The FIG. 1 shows just one embodiment where the various aspects of the present invention may be implemented. Several other embodiments are described as well.

Figure 2:
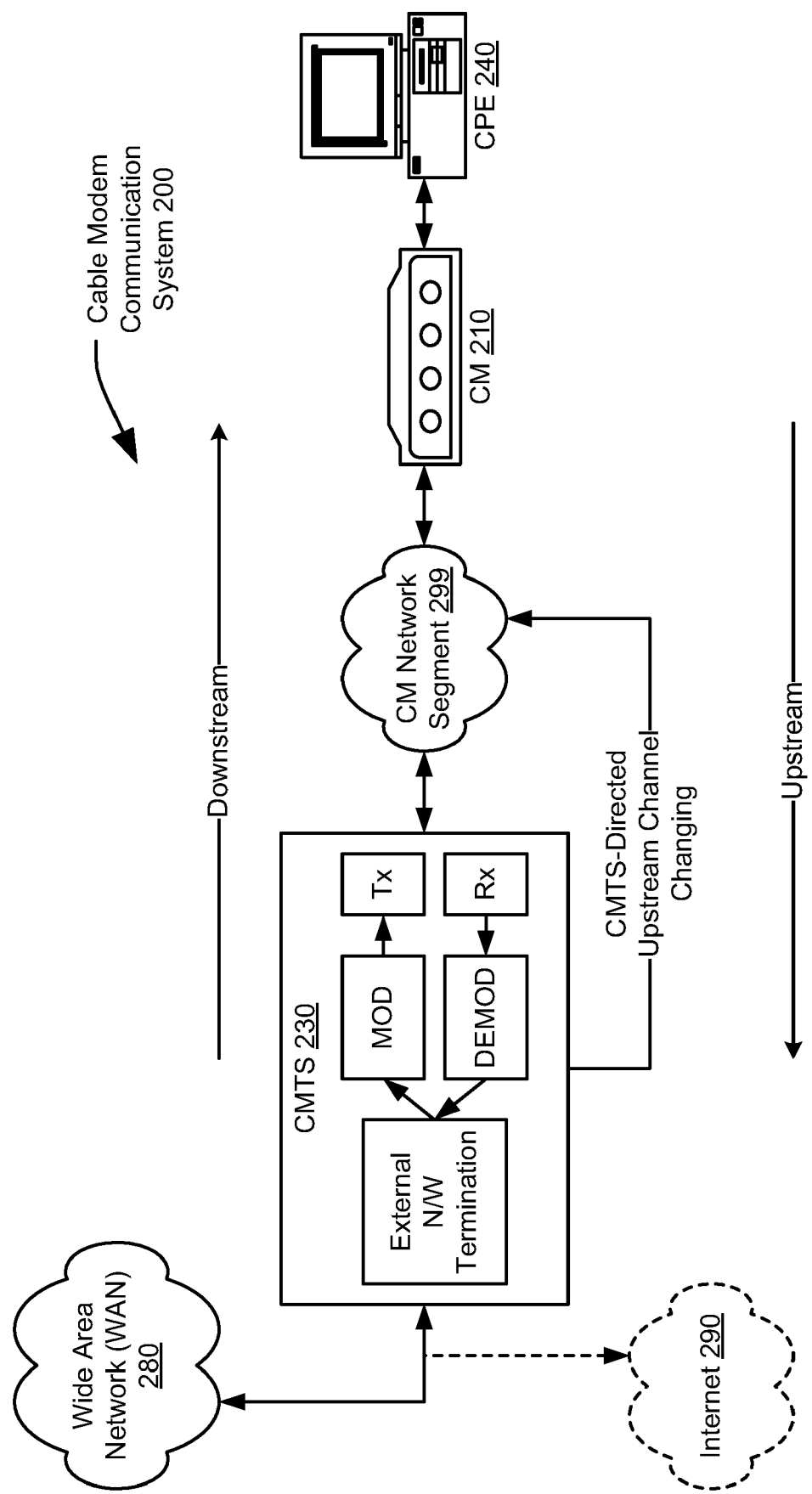
FIG. 2 is a system diagram illustrating another embodiment of a CM communication system that is built according to the present invention.

FIG. 2 is a system diagram illustrating another embodiment of a CM communication system 200 that is built according to the present invention. From certain perspectives, the FIG. 2 may be viewed as a communication system allowing bi-directional communication between a customer premise equipment (CPE) 240 and a network. In some embodiments, the CPE 240 is a personal computer or some other device allowing a user to access an external network. The network may be a wide area network (WAN) 280, or alternatively, the Internet 290 itself. For example, the CM communication system 200 is operable to allow Internet protocol (IP) traffic to achieve transparent bi-directional transfer between a CMTS-network side interface (CMTS-NIS: viewed as being between the CMTS 230 and the Internet 290) and a CM to CPE interface (CMCI: viewed as being between the CM 210 and the CPE 240).

The WAN 280, and/or the Internet 290, is/are communicatively coupled to the CMTS 230 via a CMTS-NIS. The CMTS 230 is operable to support the external network termination, for one or both of the WAN 280 and the Internet 290. The CMTS 230 includes a modulator and a demodulator to support transmitter and receiver functionality to and from a CM network segment 299. A number of elements may be included within the CM network segment 299, as understood by those persons having skill in the art. For example, routers, splitters, couplers, relays, and amplifiers may be contained within the CM network segment 299 without departing from the scope and spirit of the invention. The CM network segment 299 allows communicative coupling between a CM user and the CMTS 230.

The CMTS 230 is operable to direct upstream channel changing for upstream data bursts from the CM 210 to the CMTS 230. This may be viewed as directing the particular channels by which the CM 210 is able to send upstream data bursts to the CMTS 230. The particular channels may themselves be logical channels of a single frequency band, or alternatively they may be physical distinct channels separated in frequency. The upstream data burst functionality provided by the interaction of the CMTS 230 with the CM network segment 299 allows for more robust operation of the CM communication system 200 when compared to prior art approaches.

Figure 3:
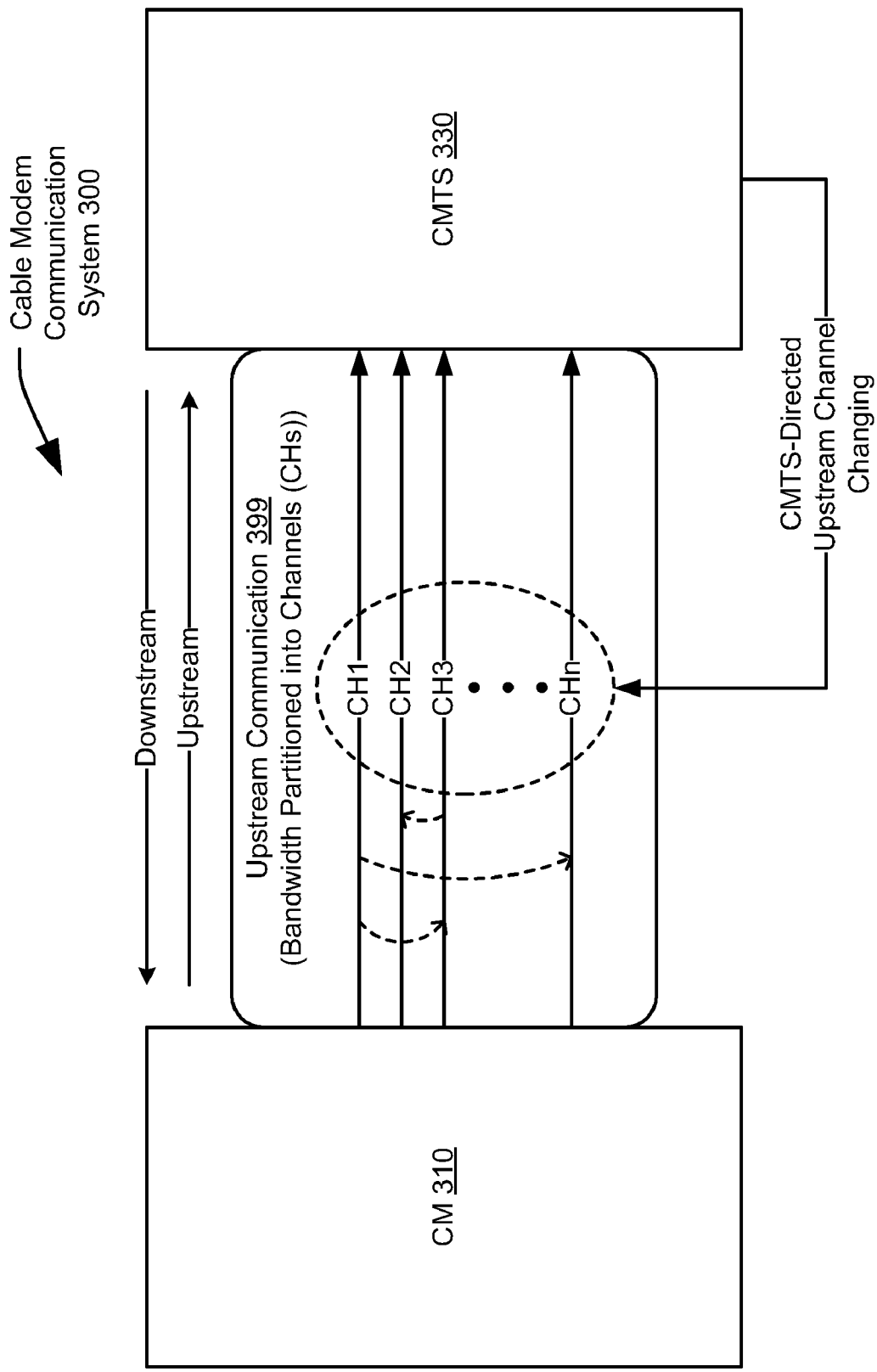
FIG. 3 is a system diagram illustrating another embodiment of a CM communication system that is built according to the present invention.

FIG. 3 is a system diagram illustrating another embodiment of a CM communication system 300 that is built according to the present invention. The CM communication system 300 includes a CM 310 that is operable to perform upstream communication 399 to a CMTS 330. The bandwidth of the upstream communication 399, from the CM 310 to the CMTS 330, is partitioned into a number of channels in the FIG. 3. This partitioning may involve logical partitioning of the channels of a single frequency band, or alternatively the partitioning may involve physical portioning of the available bandwidth into distinct channels that are separated in frequency.

The CMTS 330 is operable to direct upstream channel changing for upstream data bursts from the CM 310 to the CMTS 330. As shown in the upstream communication 399, the number of channels (shown as a CH1, CH2, CH3, . . . , and CHn) are the available channels over which the CMTS 330 may change the upstream data bursting of the CM 310 to the CMTS 330. The channel changing may be performed between upstream data bursts while maintaining a high degree of robustness and continued operation. In addition, the channel changing may be performed between upstream data bursts without requiring initialization and ranging processes to be performed before changing to another channel. The present invention offers a solution that allows the channel changing to a new channel without requiring any prior knowledge of the state of corruption or the capabilities of the network channel thereby offering continued operation.

Figure 4:
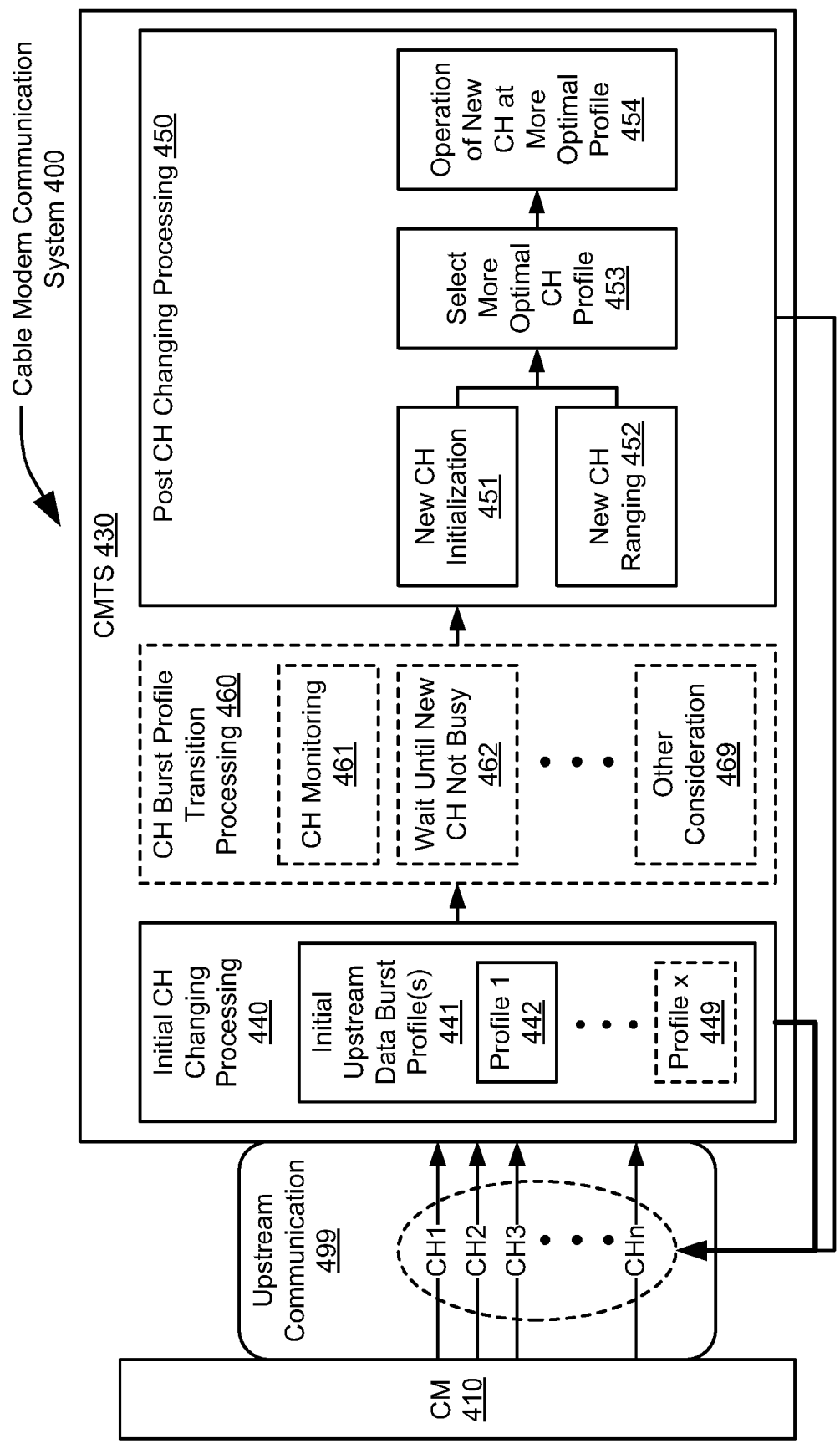
FIG. 4 is a system diagram illustrating another embodiment of a CM communication system that is built according to the present invention.

FIG. 4 is a system diagram illustrating another embodiment of a CM communication system 400 that is built according to the present invention. The CM communication system 400 includes a CM 410 that is operable to perform upstream communication 499 to a CMTS 430. From certain perspectives, the FIG. 4 may be viewed as one particular embodiment of the functionality that may be performed within the FIG. 3; clearly, the FIG. 3 may also be viewed as described variations of embodiment that are different than the FIG. 4. The bandwidth of the upstream communication 499, from the CM 410 to the CMTS 430, is partitioned into a number of channels in the FIG. 4. Again and similar to the FIG. 3, this partitioning within the FIG. 4 may involve logical partitioning of the channels of a single frequency band, or alternatively the partitioning may involve physical portioning of the available bandwidth into distinct channels that are separated in frequency.

The CMTS 430 is operable to direct upstream channel changing for upstream data bursts from the CM 410 to the CMTS 430. As shown in the upstream communication 499, the number of channels (shown as a CH1, CH2, CH3, ..., and CHn) are the available channels over which the CMTS 430 may change the upstream data bursting of the CM 410 to the CMTS 430. The channel changing may be performed between upstream data bursts while maintaining a high degree of robustness and continued operation. In addition, the channel changing may be performed between upstream data bursts without requiring initialization and ranging processes to be performed before changing to another channel. The present invention offers a solution that allows the channel changing to a new channel without requiring any prior knowledge of the state of corruption or the capabilities of the network channel thereby offering continued operation.

The operations performed within the CMTS 430 may be described as follows: the CMTS 430 is operable to perform initial channel changing processing 440 that is followed by post channel changing processing 450. In certain embodiments, the CMTS 430 is operable to perform the initial channel changing processing 440, followed by channel burst profile processing 460, and ultimately followed by performing the post channel changing processing 450.

The initial channel changing processing 440 involves using information of a predetermined number of initial upstream data burst profiles(s) 441. The initial upstream data burst profiles(s) 441 may include multiple upstream data burst profiles, shown as a profile 1 442, ..., and a profile x 449. The initial upstream data burst profiles(s) 441 may be arranged and selectively included so that some profiles better accommodate shorter data burst, some profiles better accommodate longer data burst, and/or other considerations as well. The initial upstream data burst profiles(s) 441 may be used to offer a high degree of robustness thereby ensuring that an upstream data burst will virtually always be able to be made from the CM 410 to the CMTS 430. For example, the initial upstream data burst profiles(s) 441 will include at least one profile that will enable continued transmission of an upstream data burst from the CM 410 to the CMTS 430 between upstream data bursts. The initial channel changing processing 440 may be viewed as performing the necessary processing to begin and/or continue upstream data burst transmitting functionality without requiring the performance of the initialization and the ranging processes to be performed when changing channels from one to another for upstream data bursting from the CM 410 to the CMTS 430.

Subsequently, after some predetermined period of time and/or after meeting some predetermined conditions, the CMTS 430 performs the post channel changing processing 450. This will involve performing the initialization and ranging processes on the new channel to which the upstream data bursting has been changed (shown as new channel initialization 451 and new channel ranging 452, respectively). After these processes have been performed, then the CMTS 430 selects a more optimal channel profile in a functional block 453. Then, the CMTS 430 directs the CM 410 to perform using the more optimal profile on the new channel (e.g., reference numeral 454). There may instances where the selection of the more optimal channel profile within the functional block 453 involves determining that the lowest order, most robust channel profile, that has already been initially used as shown within the initial channel changing processing 440, is in fact the higher order channel profile that may be employed on the new channel. In such a case, the selection of the more optimal channel profile in the functional block 453 serves as a verification/validation that this channel profile is in fact the highest order channel profile available. Alternatively, the selection of the more optimal channel profile in the functional block 453 may involve selecting a higher order channel profile that enables greater throughput on the new channel. In some embodiments, the selection of the more optimal channel profile in the functional block 453 may simply involve waiting a predetermined period of time before switching to a higher order channel profile.

In some alternative embodiments, the channel burst profile transition processing 460 in between performing the initial channel changing processing 440 and the post channel changing processing 450. This channel burst profile transition processing 460 may involve monitoring the new channel as shown in a functional block 461. In addition, the channel burst profile transition processing 460 may involve waiting until the new channel is not busy as shown in a functional block 462. This waiting until the new channel is not busy in the functional block 462 may involve waiting until there is a time space between upstream data bursts, and/or waiting until the new channel is simply completely idle for a predetermined period of time. The channel burst profile transition processing 460 may also involve some other consideration 469 that may be used to trigger the beginning of the post channel changing processing 450. The channel burst profile transition processing 460 may be viewed as an optional intermediary processing that is performed after performing the initial channel changing from one channel to a new channel for upstream data bursting from the CM 410 to the CMTS 430.

Figure 5:
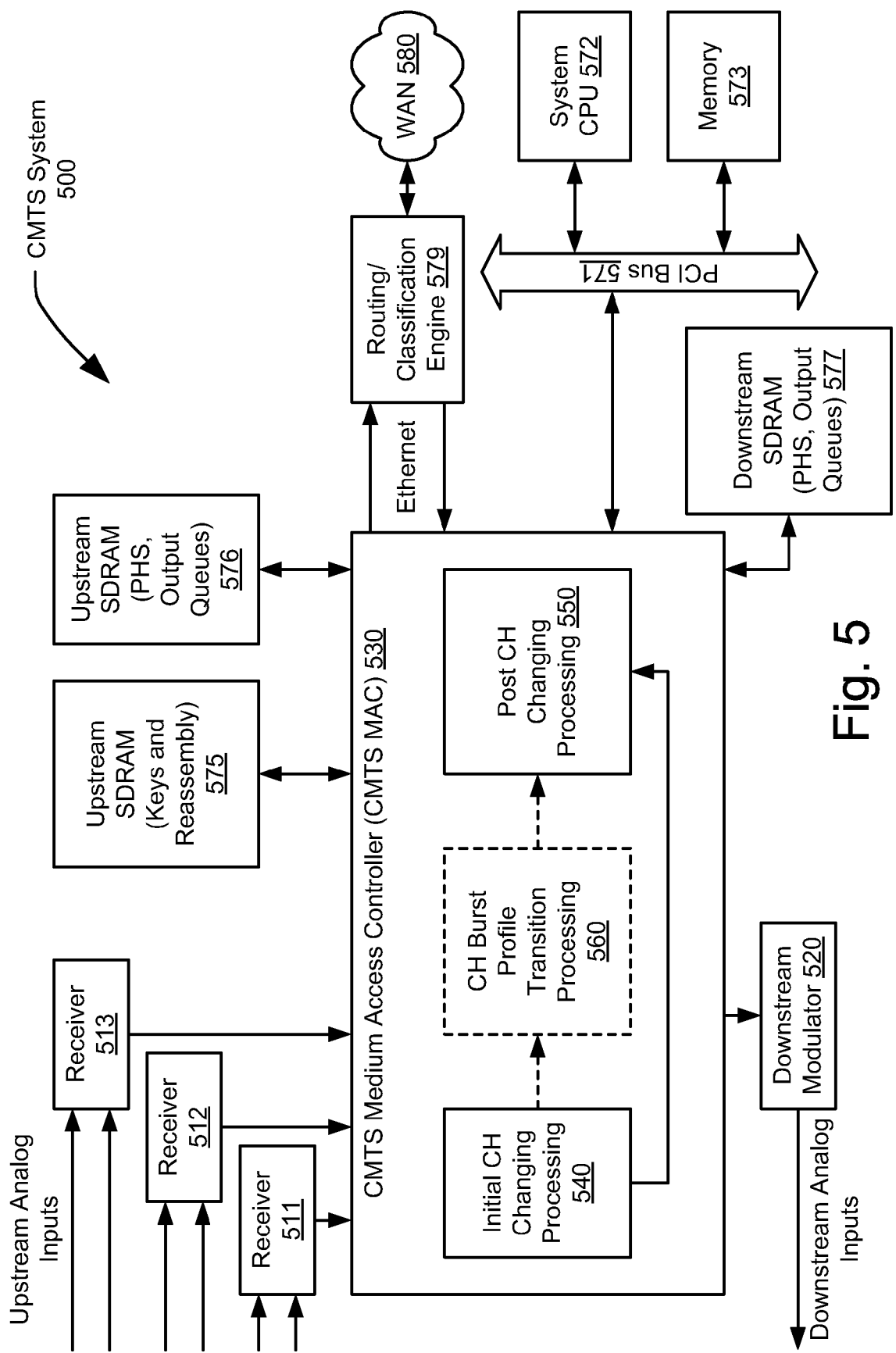
FIG. 5 is a system diagram illustrating an embodiment of a CMTS system that is built according to the present invention.

FIG. 5 is a system diagram illustrating an embodiment of a CMTS system 500 that is built according to the present invention. The CMTS 500 includes a CMTS medium access controller (MAC) 530 that operates with a number of other devices to perform communication from one or more CMs to a WAN 580. The CMTS MAC 530 may be viewed as providing the hardware support for MAC-layer per-packet functions including fragmentation, concatenation, and payload header suppression that all are able to offload the processing required by a system central processing unit (CPU) 572. This will provide for higher overall system performance. In addition, the CMTS MAC 530 is able to provide support for carrier class redundancy via timestamp synchronization across a number of receivers, shown as a receiver 511, a receiver 511, and a receiver 513 that are each operable to receive upstream analog inputs. In addition, the CMTS MAC 530 may be operated remotely with a routing/classification engine 579 that is located externally to the CMTS MAC 530 for distributed CMTS applications including mini fiber node applications. Moreover, Standard Programming Interface (SPI) master port may be employed to control the interface to the receivers 511, 512, and 513 as well as to a downstream modulator 520.

The CMTS MAC 530 may be viewed as being a highly integrated CMTS MAC integrated circuit (IC) for use within the various DOCSIS and advanced TDMA physical layer (PHY-layer) CMTS products. The CMTS MAC 530 employs sophisticated hardware engines for upstream and downstream paths. The upstream processor design is segmented and uses two banks of Synchronous Dynamic Random Access Memory (SDRAM) to minimize latency on internal buses. The two banks of SDRAM used by the upstream processor are shown as upstream SDRAM 575 (operable to support keys and reassembly) and SDRAM 576 (operable to support Packaging, Handling, and Storage (PHS) and output queues). The upstream processor performs Data Encryption Standard (DES) decryption, fragment reassembly, de-concatenation, payload packet expansion, packet acceleration, upstream Management Information Base (MIB) statistic gathering, and priority queuing for the resultant packets. Each output queue can be independently configured to output packets to either a Personal Computer Interface (PCI) or a Gigabit Media Independent Interface (GMII). DOCSIS MAC management messages and bandwidth requests are extracted and queued separately from data packets so that they are readily available to the system controller.

The downstream processor accepts packets from priority queues and performs payload header suppression, DOCSIS header creation, DES encryption, Cyclic Redundancy Check (CRC) and Header Check Sequence (of the DOCSIS specification), Moving Pictures Experts Group (MPEG) encapsulation and multiplexing, and timestamp generation on the in-band data. The CMTS MAC 530 includes an out-of-band generator and TDMA PHY-layer interface so that it may communicate with a CM device's out-of-band receiver for control of power management functions. The downstream processor will also use SDRAM 577 (operable to support PHS and output queues). The CMTS MAC 530 may be configured and managed externally via a PCI interface and a PCI bus 571.

The CMTS MAC 530 is operable to perform initial channel changing processing 540 that is followed by post channel changing processing 550. In certain embodiments, the CMTS MAC 530 is operable to perform the initial channel changing processing 540, followed by channel burst profile processing 560, and ultimately followed by performing the post channel changing processing 550. The FIG. 5 shows yet another embodiment in which upstream data burst channel changing may be performed according to the present invention. Any of the functionality and operations described in the other embodiments may be performed within the context of the CMTS system 500 without departing from the scope and spirit of the invention.

The FIGS. 6 and 7 described below show particular embodiments of functionality that may be performed within CMTSs arranged according to the present invention. Related CM upstream channel changes methods are described generically below in the FIGS. 10 and 11. The FIGS. 6 and 7 may be viewed including functionality within CMTSs that are operable to perform the operations described within the FIGS. 10 and 11, yet the FIGS. 10 and 11 may also be viewed as operations being performed at higher levels besides solely a CMTS-level without departing from the scope and spirit of the invention.

Figure 6:
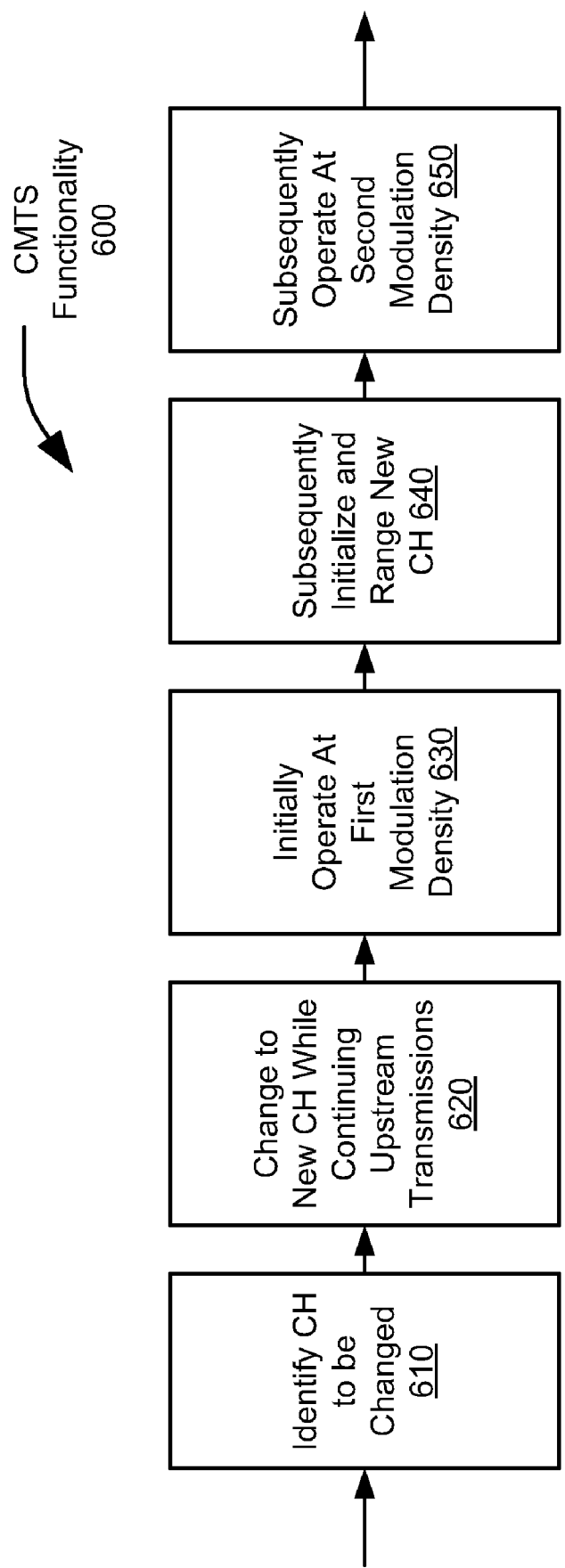
FIG. 6 is a functional block diagram illustrating an embodiment of CMTS functionality that is performed according to the present invention.

FIG. 6 is a functional block diagram illustrating an embodiment of CMTS functionality 600 that is performed according to the present invention. In a functional block 610, a channel is identified that is to be changed. Then, in a functional block 620, upstream data transmissions continue while performing the channel changing. Initially, as shown in a functional block 630, the new channel is operated with a first modulation density. Then, as shown in a functional block 640, the new channel undergoes initialization and ranging. Subsequently, the new channel is then operated at a second modulation density as shown in a functional block 650. The FIG. 6 shows how a new channel, to which upstream data bursting has been changing, may first be operated using a first modulation density and subsequently at a second modulation density after having undergone initialization and ranging processes. The functionality described with respect to the FIG. 6 may be viewed as functionality and operations performed within any of the CMTSs described within the patent application. Each of the functional blocks within the FIG. 6 may be viewed as being associated with a portion/portions of components within a CMTS, including processors, CMTS MACs, and other functional blocks within a CMTS.

Figure 7:
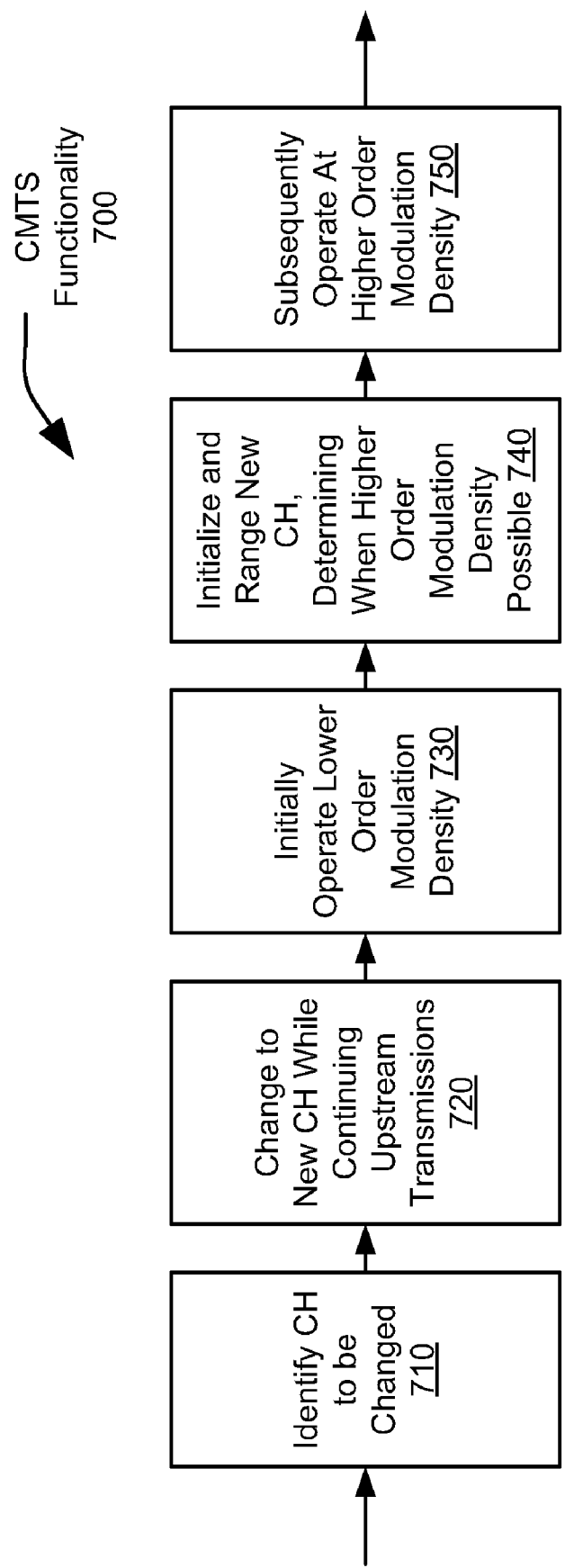
FIG. 7 is a functional block diagram illustrating another embodiment of CMTS functionality that is performed according to the present invention.

FIG. 7 is a functional block diagram illustrating another embodiment of CMTS functionality that is performed according to the present invention. In a functional block 710, a channel is identified that is to be changed. Then, in a functional block 720, upstream transmissions continue while performing the channel changing. Initially, as shown in a functional block 730, the new channel is operated a relatively lower order modulation density. Then, as shown in a functional block 740, the new channel undergoes initialization and ranging thereby determining a relatively higher order modulation density that is the highest modulation density that is possible on the new channel. Subsequently, the new channel is then operated at this determined, higher order modulation density as shown in a functional block 750. The FIG. 7 shows how a new channel, to which upstream data bursting has been changing, may first be operated using a relatively lower order modulation density and subsequently at a higher order modulation density after having undergone initialization and ranging processes that are used to determine the higher order modulation density. The functionality described with respect to the FIG. 7 may be viewed as functionality and operations performed within any of the CMTSs described within the patent application. Each of the functional blocks within the FIG. 7 may be viewed as being associated with a portion/portions of components within a CMTS, including processors, CMTS MACs, and other functional blocks within a CMTS.

Figure 8:
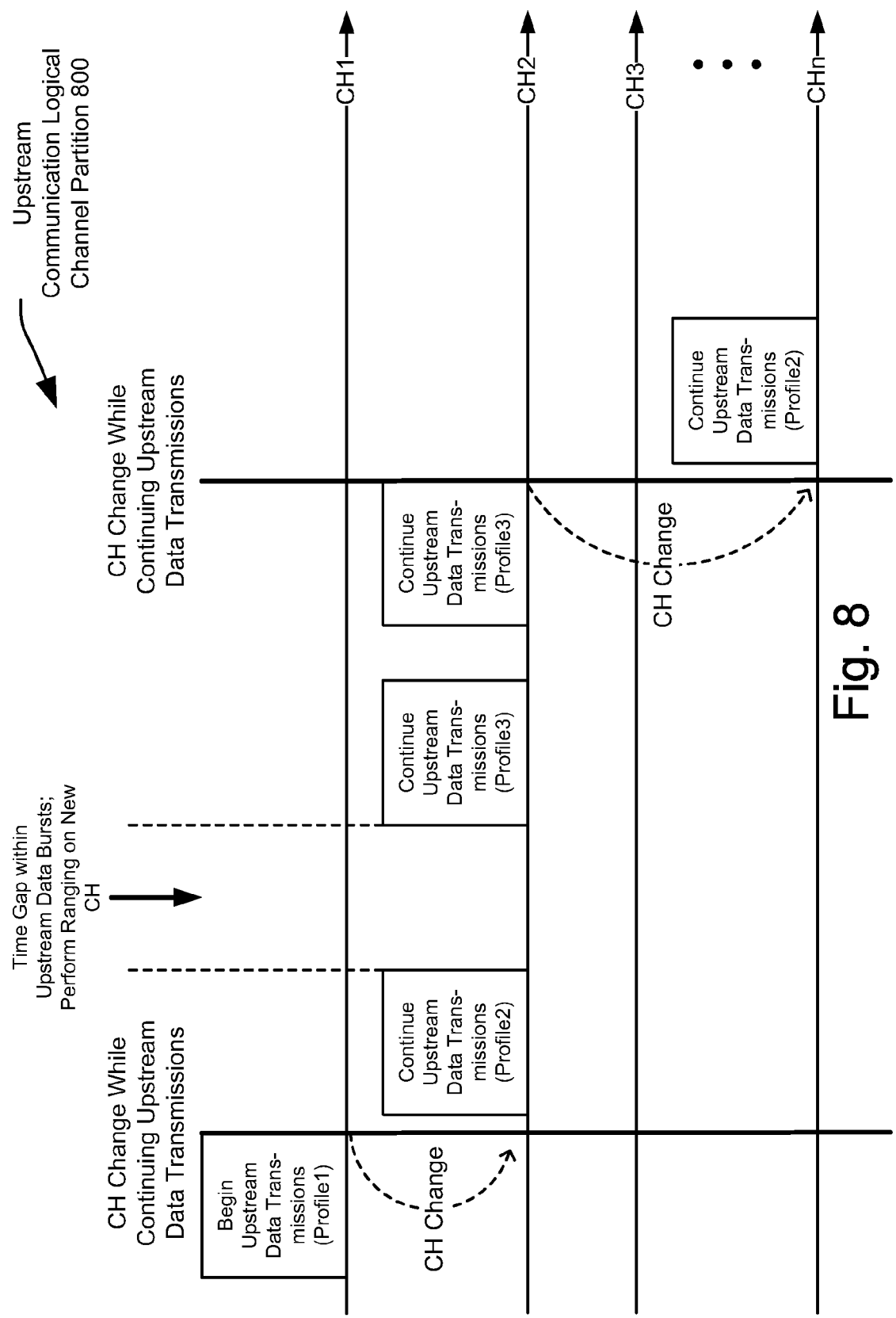
FIG. 8 is a diagram illustrating an embodiment of an upstream communication logical channel partition according to the present invention.

FIG. 8 is a diagram illustrating an embodiment of an upstream communication logical channel partition 800 according to the present invention. The various logical channels within the FIG. 8, shown as a CH1, CH2, CH3, . . . , and CHn, may be viewed as being logical channel partitions within a single frequency band.

Upstream data transmissions begin using a profile1 on a CH1. Then, between upstream bursts, a channel change is directed to move the upstream bursting to a CH2. The upstream data transmission simply continues after having changed from the CH1 to the CH2; however, the continuation of the upstream bursts on CH2 uses a profile2. Subsequently, there is a time gap within the upstream data bursts, during which time the CM may range on CH2 and is able to advance to more efficient burst profiles. The upstream bursts then continue in the CH2 using a profile3. This profile3 may have been identified/determined during the time gap within the upstream bursts, perhaps using ranging bursts from the CM or perhaps using analysis of the received data burst transmissions, or prior uses on CH2 by that CM, or a combination of these. The profile3 may be viewed as being an optimal upstream data burst profile for the CH2.

After some time of the continuation of the upstream data bursts on the CH2, another channel change is directed to move the upstream bursting from the CH2 to a CHn. Again, the upstream data bursts simply continue after having changed from the CH2 to the CHn; however, the continuation of the upstream data bursts on the CHn again uses the profile2. The profile2 may be viewed as the upstream data burst profile that is initially used when performing channel changing from one channel to another. As can be seen, whenever a channel change is initiated, then the next use of a profile is the profile2 in the embodiment shown within the FIG. 8. It is noted, however, that there may also be multiple initial data burst profiles, and perhaps even one per channel, or more than one available per channel (using the multiple logical channels on a same or nearly same center frequency).

Figure 9:
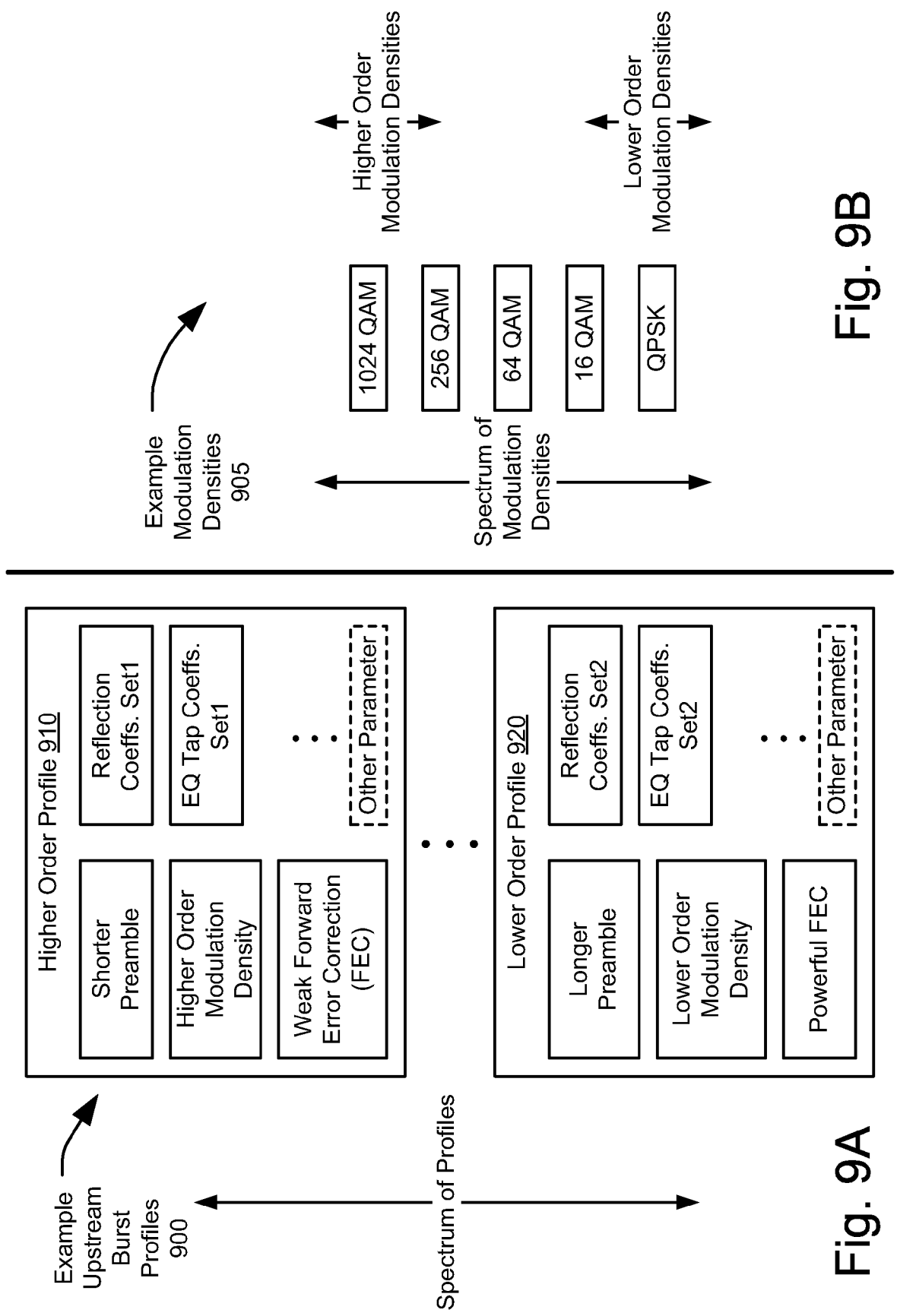
FIG. 9A is a diagram illustrating an embodiment of example upstream burst profiles according to the present invention.
FIG. 9B is a diagram illustrating an embodiment of example modulation densities according to the present invention.

FIG. 9A is a diagram illustrating an embodiment of example upstream burst profiles 900 according to the present invention. A spectrum of upstream data burst profiles may be used. Generically speaking, a higher order profile 910 and a lower order profile may be used. The higher order profile 910 may be viewed as having a relatively shorter preamble, a relatively higher modulator density, relatively weak Forward Error Correction (FEC), an equalizer tap coefficient set1, a reflection coefficients set1, and other parameters as required or desired. The higher order profile 910 may be viewed as being operable on a channel whose characteristics can support this higher order level of processing. A relatively accurate channel estimation and channel equalization may need to be performed to accommodate upstream data bursting using the higher order profile 910.

The lower order profile 920 may be viewed as having a relatively longer preamble, a relatively lower modulator density, relatively powerful FEC, an equalizer tap coefficient set2, a reflection coefficients set2, and other parameters as required or desired. The lower order profile 920 may be viewed as being operable on a channel whose characteristics are unable to support the higher order level of processing within the higher order profile 910. A relatively accurate channel estimation and channel equalization may not be available or may be unable to be performed to accommodate upstream data bursting using the higher order profile 910, the present invention then provides operation using the lower order profile 920.

The FIG. 9A shows a spectrum of available upstream data burst profiles that may be used according to the present invention to perform and continue upstream data bursting using an appropriate degree of processing without losing data. Upstream data bursts may be continued while switching from the higher order profile 910 to the lower order profile 920. The upstream data bursting may continue using the lower order profile 920, though perhaps at a lower throughput, yet the lower order profile 920 will provide sufficient protection to ensure that the upstream data burst will get through even when the channel may be corrupted. The upstream data burst profiles include a modulation density. The modulation density may be viewed as being one parameter within an upstream data burst profile. If desired, and as will be shown and described in various embodiments, various profiles may be employed when performing enhanced DOCSIS channel changing according to the present invention; or alternatively, only various modulation densities may be employed when performing enhanced DOCSIS channel changing according to the present invention. Clearly, other operational parameters may be used to differentiate and continue upstream data bursting when performing channel changing.

FIG. 9B is a diagram illustrating an embodiment of example modulation densities 905 according to the present invention. The FIG. 9B shows a spectrum of modulation densities that may be employed according to the present invention. The spectrum of modulation densities involves higher order modulation densities and lower order modulation densities. For example, the spectrum of modulation densities ranges from 1024 QAM, 256 QAM, 64 QAM, 16 QAM, and QPSK. Other modulation schemes could similarly be employed and arranged in an increasing/decreasing order of density without departing from the scope and spirit of the invention. The higher order modulation densities may be viewed as including the 1024 QAM and 256 QAM, and the lower order modulation densities may be viewed as including the 16 QAM and QPSK. In some embodiments, a higher order modulation density may be viewed as including only 16 QAM, and a lower order modulation density may be viewed as including only QPSK.

The higher order modulation densities may be used within those channels that have been adequately initialized and ranged to support that level of modulation density, and the low order modulation densities may be used within those channels that have not yet been adequately initialized and ranged to support higher levels of modulation density. In certain embodiments, the present invention switches directly to a lower level of modulation density after undergoing a channel change, and then after performing initialization and ranging, and after determining/identifying a possible higher level of modulation density, that new channel is operated using the higher level of modulation density.

Figure 10:
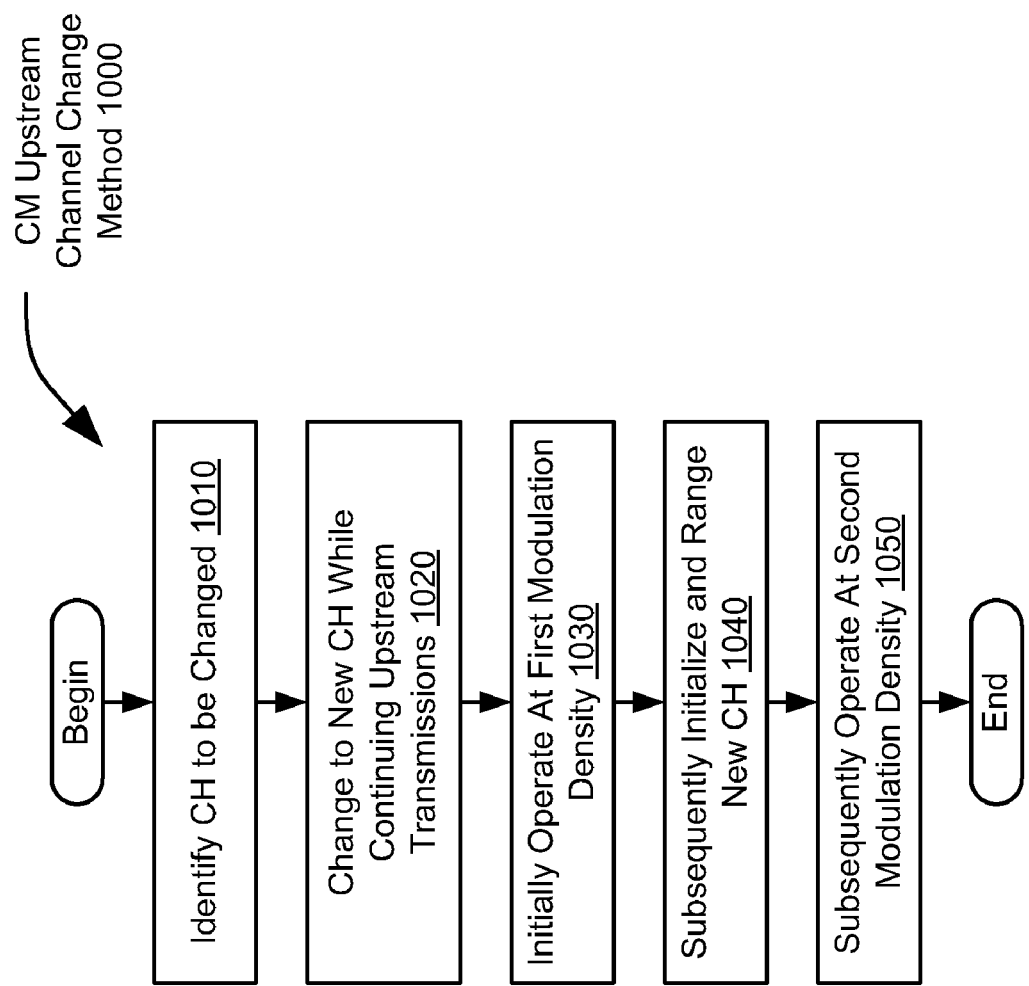
FIG. 10 is a flowchart illustrating an embodiment of a CM upstream channel change method that is performed according to the present invention.

FIG. 10 is a flowchart illustrating an embodiment of a CM upstream channel change method 1000 that is performed according to the present invention. In a block 1010, a channel is identified that is to be changed. Then, in a block 1020, upstream transmission is continued while performing the channel changing. Initially, as shown in a block 1030, the new channel is operated a first modulation density. Then, as shown in a block 1040, the new channel undergoes initialization and ranging. Subsequently, the new channel is then operated at a second modulation density as shown in a block 1050.

The FIG. 10 shows how a new channel, to which upstream data bursting has been changed, may first be operated using a first modulation density and subsequently at a second modulation density after having undergone initialization and ranging processes. The operations described with respect to the FIG. 10 may be performed in any of the various embodiments described within the patent application. The FIG. 10 may be viewed as being a method that is performed at a system level, at a CMTS level, at a CM level, or another level within any CM communication system that is built according to the present invention. The functionality of the CMTS functionality 600 functional block diagram may be viewed as being the functionality specific to a CMTS. The CM upstream channel change method 1000 may be viewed more generically as supporting the methodology of enhanced DOCSIS upstream channel changing according to the present invention using other devices in cooperation with a CMTS.

Figure 11:
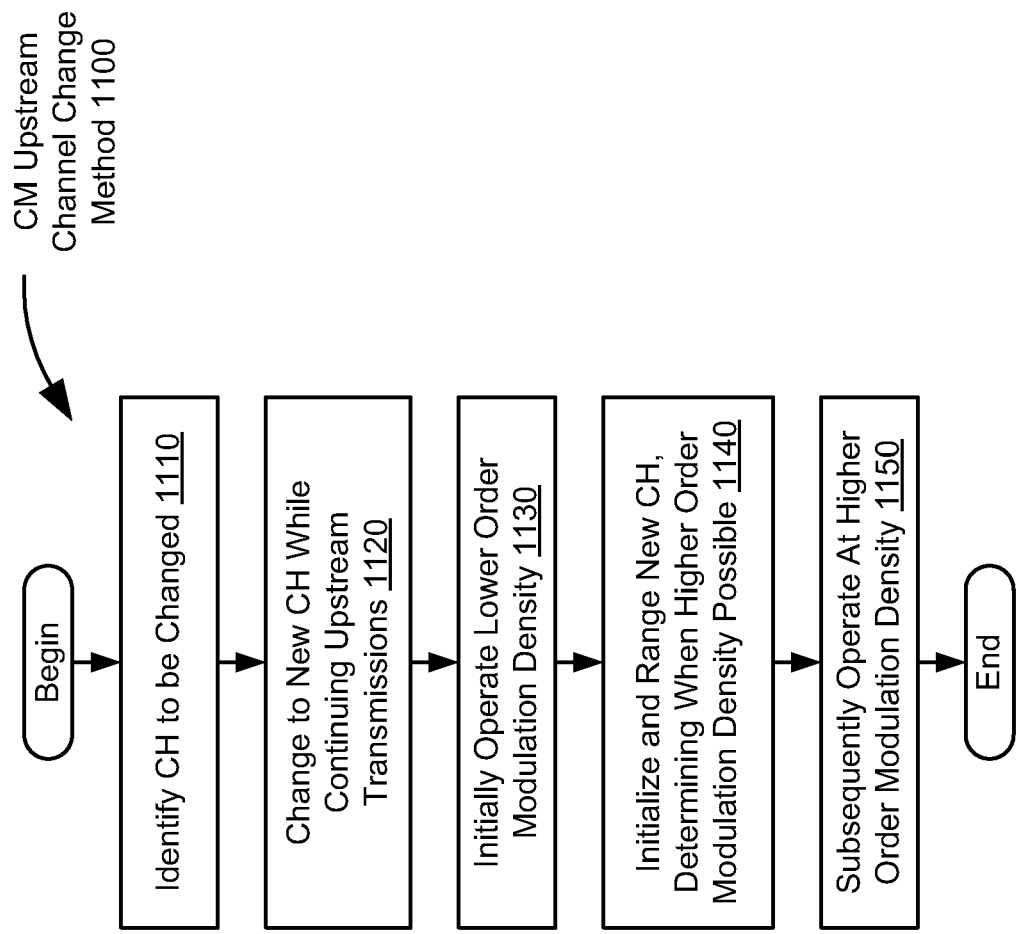
FIG. 11 is a flowchart illustrating another embodiment of a CM upstream channel change method that is performed according to the present invention.

FIG. 11 is a flowchart illustrating another embodiment of a CM upstream channel change method that is performed according to the present invention. In a block 1110, a channel is identified that is to be changed. Then, in a block 1120, upstream transmission is continued while performing the channel changing. Initially, as shown in a block 1130, the new channel is operated a relatively lower order modulation density. Then, as shown in a block 1140, the new channel undergoes initialization and ranging thereby determining a relatively higher order modulation density that is the highest modulation density that is possible on the new channel. Subsequently, the new channel is then operated at this determined, higher order modulation density as shown in a block 1150.

The FIG. 11 shows how a new channel, to which upstream data bursting has been changed, may first be operated using a lower order modulation density and subsequently at a higher order modulation density after having undergone initialization and ranging processes. The operations described with respect to the FIG. 11 may be performed in any of the various embodiments described within the patent application. The FIG. 11 may be viewed as being a method that is performed at a system level, at a CMTS level, at a CM level, or another level within any CM communication system that is built according to the present invention. The functionality of the CMTS functionality 700 functional block diagram may be viewed as being the functionality specific to a CMTS. The CM upstream channel change method 1100 may be viewed more generically as supporting the methodology of enhanced DOCSIS upstream channel changing according to the present invention using other devices in cooperation with a CMTS.

Figure 12:
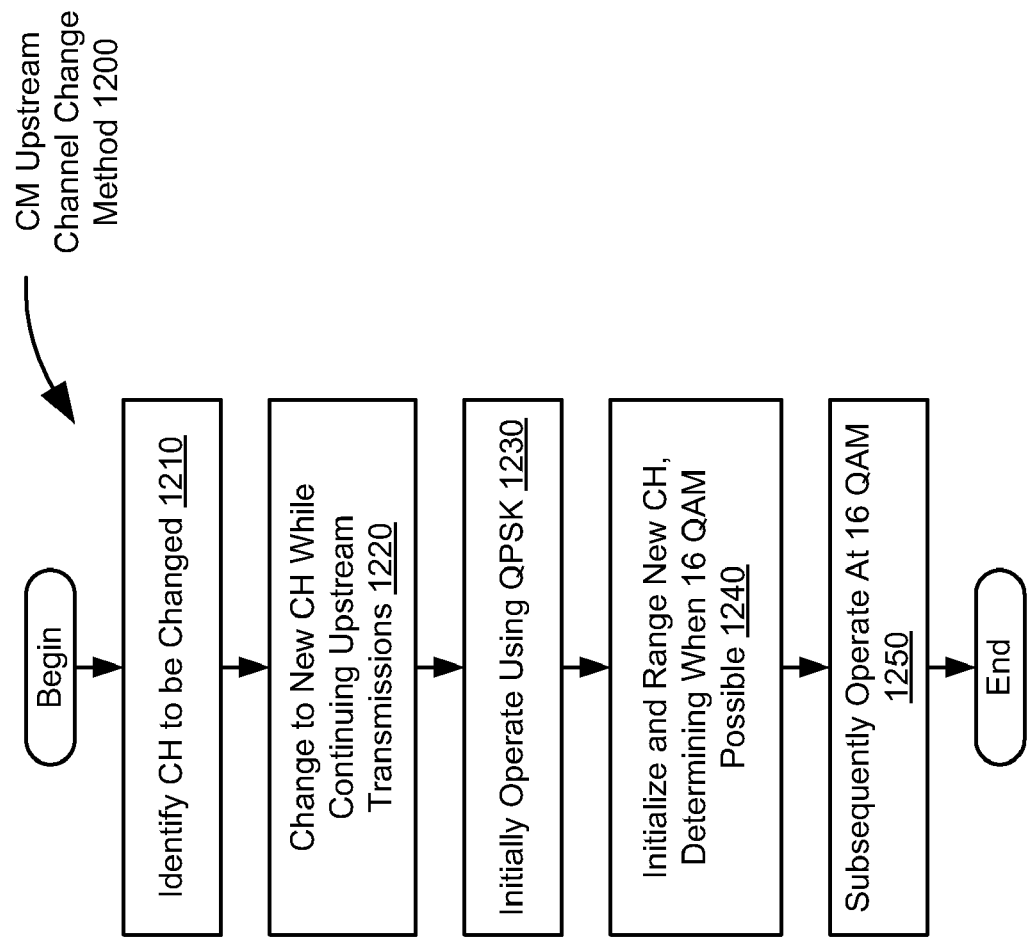
FIG. 12 is a flowchart illustrating another embodiment of a CM upstream channel change method that is performed according to the present invention.

FIG. 12 is a flowchart illustrating another embodiment of a CM upstream channel change method 1200 that is performed according to the present invention. In a block 1210, a channel is identified that is to be changed. Then, in a block 1220, upstream transmission is continued while performing the channel changing. Initially, as shown in a block 1230, the new channel is operated using a QPSK modulation density. Then, as shown in a block 1240, the new channel undergoes initialization and ranging thereby determining when a 16 QAM modulation density is possible on the new channel. After it is determined that the new channel can support the 16 QAM modulation density, then the new channel is operated at the 16 QAM modulation density as shown in a block 1250.

The FIG. 12 may be viewed as being an embodiment where there are two available modulation densities (QPSK and 16 QAM) that may be used when operating a channel, and a new channel initially operates at a QPSK modulation density when changing to the new channel. Only after it has been determined that the new channel can actually support a 16 QAM modulation density does the channel begin to operate using the 16 QAM modulation density.

Figure 13:
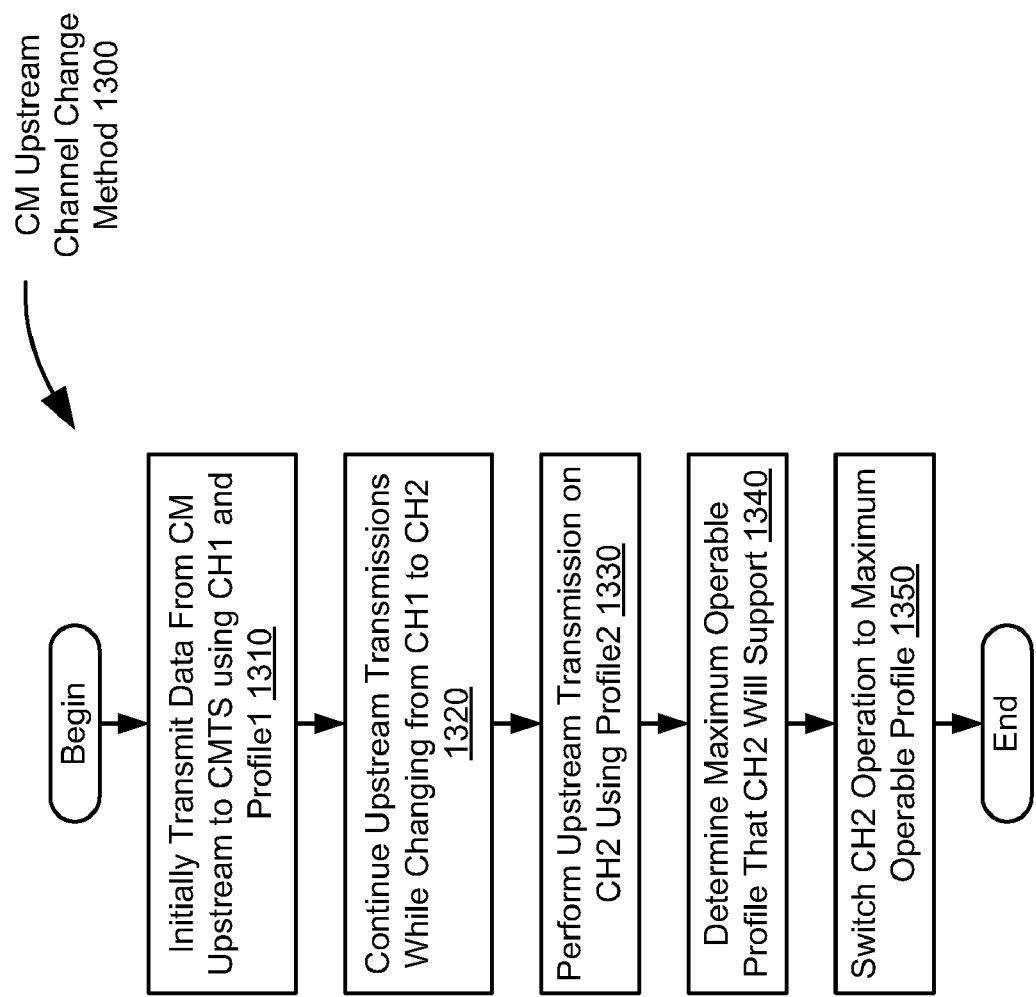
FIG. 13 is a flowchart illustrating another embodiment of a CM upstream channel change method that is performed according to the present invention.

FIG. 13 is a flowchart illustrating another embodiment of a CM upstream channel change method 1300 that is performed according to the present invention. In a block 1310, data is initially transmitted from a CM upstream to CMTS using a CH1 and a profile1. Then, in a block 1320, upstream data transmission is continued while performing the channel changing from CH1 to CH2. Initially, as shown in a block 1330, the upstream transmission on the CH2 is performed using a profile2. Then, as shown in a block 1340, it is determined that a maximum operable profile may be supported on the CH2. After it is determined that the maximum operable profile may be supported on the CH2, then the CH2 switches operation to the maximum operable profile as shown in a block 1350.

The FIG. 13 may be viewed as being an embodiment where there are at least two upstream data burst profiles that may be used when operating a CH2 (to which upstream data bursting has been changed from a CH1), and a CH2 initially operates at profile1 when changing to the CH2. Only after it has been determined that the CH2 can actually support a maximum operable profile does the channels begin to operate using the maximum operable profile.

Figure 14:
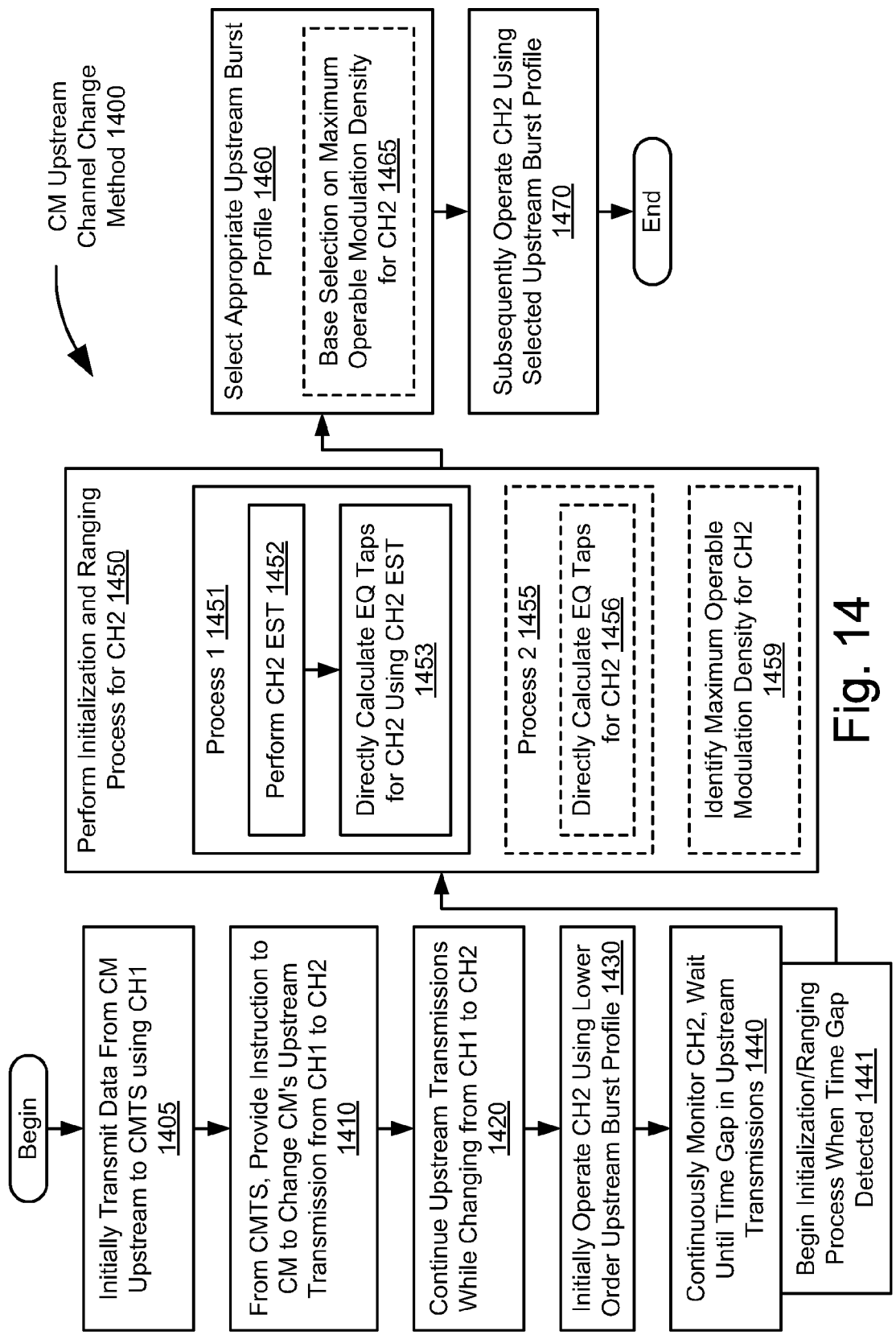
FIG. 14 is a flowchart illustrating another embodiment of a CM upstream channel change method that is performed according to the present invention.

FIG. 14 is a flowchart illustrating another embodiment of a CM upstream channel change method 1400 that is performed according to the present invention. In a block 1405, data is initially transmitted upstream from a CM to a CMTS using CH1. Then, from the CMTS, an instruction is provided to the CM to change the CM's upstream transmission from CH1 to CH2 in a block 1410. The upstream transmission is continued while changing channels from CH1 to CH2 as shown in a block 1420. Initially, the CH2 is operated at a relatively lower order upstream data burst profile as shown in a block 1430.

As shown in a block 1440, the CH2 is continuously monitored until a time gap is detected in the upstream transmission. Then, upon detection of the time gap, then the initialization and ranging processes are begun as shown in a block 1441. In a block 1450, the initialization and ranging processes are actually performed for the CH2. The initialization and ranging processes 1450 may involve a number of operations. As shown in a block 1451, a process 1 may be performed.

Alternatively, as shown in a block 1455, a process 2 may be performed. Within the process 1 shown in the block 1451, channel estimation of CH2 is performed as shown in a block 1452; after an accurate channel estimation for the CH2 has been performed, then direct calculation of equalizer taps for CH2 is performed in a block 1453 using the previously generated channel estimation (from the block 1452). In the alternative process 2 shown in the block 1455, channel estimation of CH2 need not be performed, but rather equalizer taps calculation is performed directly for CH2 in a block 1456.

In addition, other operations may be performed in doing the initialization and ranging processes for CH2 within the block 1450. One possible option involves identifying a maximum operable modulation density is identified for CH2 as shown in a block 1459. This maximum operable modulation density is identified based on channel estimation and/or channel equalization tap calculation that is performed using the process 1 1451 and/or the process 2 1455.

Afterwards, in a block 1460, an appropriate upstream data burst profile is selected. As shown in a block 1465, this selection may be performed using the identified, maximum operable modulation density for the CH2 (that may be identified within the block 1459). The CH2 is then operated using the selected upstream data burst profile as shown in a block 1470.

Figure 15:
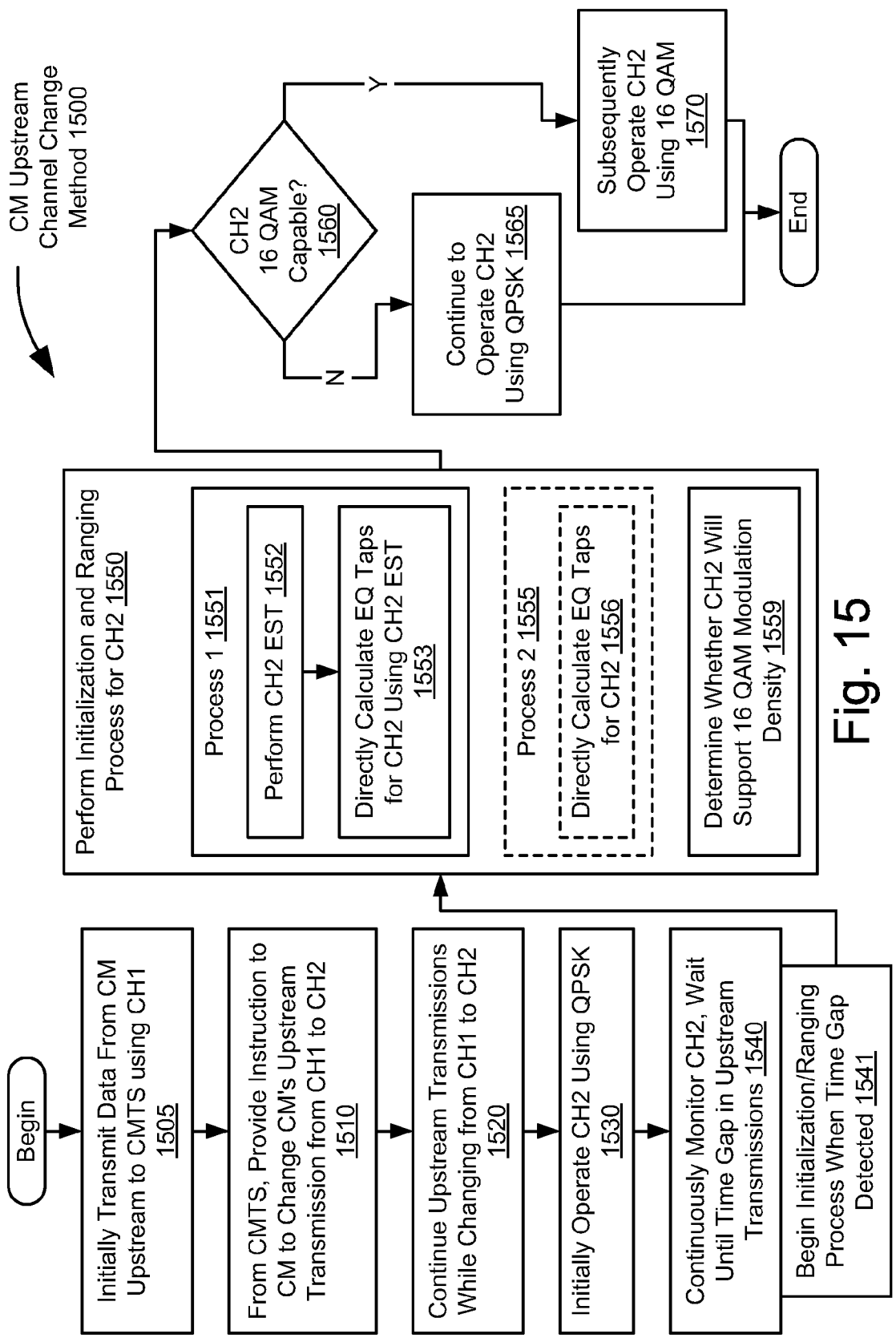
FIG. 15 is a flowchart illustrating another embodiment of a CM upstream channel change method that is performed according to the present invention.

FIG. 15 is a flowchart illustrating another embodiment of a CM upstream channel change method 1500 that is performed according to the present invention. In a block 1505, data is initially transmitted upstream from a CM to a CMTS using CH1. Then, from the CMTS, an instruction is provided to the CM to change the CM's upstream transmission from CH1 to CH2 in a block 1510. The upstream data transmissions are continued while changing channels from CH1 to CH2 as shown in a block 1520. Initially, the CH2 is operated using a QPSK modulation density as shown in a block 1530.

As shown in a block 1540, the CH2 is continuously monitored until a time gap is detected in the upstream transmission. Then, upon detection of the time gap, the initialization and ranging processes are begun as shown in a block 1541. In a block 1550, the initialization and ranging processes are actually performed for the CH2. The initialization and ranging processes 1550 may involve a number of operations. As shown in a block 1551, a process 1 may be performed. Alternatively, as shown in a block 1555, a process 2 may be performed. Within the process 1 shown in the block 1551, channel estimation of CH2 is performed as shown in a block 1552; after an accurate channel estimation for the CH2 has been performed, then direct calculation of equalizer taps for CH2 is performed in a block 1553 using the previously generated channel estimation (from the block 1552). In the alternative process 2 shown in the block 1555, channel estimation of CH2 need not be performed, but rather equalizer taps calculations are performed directly for CH2 in a block 1556.

In addition, other operations may be performed in doing the initialization and ranging processes for CH2 within the block 1550. In a block 1559, it is determined whether the CH2 will support a 16 QAM modulation density. This will be determined after having performed channel estimation and/or channel equalization tap calculations that are performed using the process 1 1551 and/or the process 2 1555.

Afterwards, in a decision block 1560, it is queried whether the CH2 will actually support the 16 QAM modulation density. If it is determined that the CH2 may in fact support the 16 QAM modulation density, then the CH2 is operated using the 16 QAM modulation density as shown in a block 1570. Alternatively, if it is determined that the CH2 will not support the 16 QAM modulation density, then the CH2 is operated using the 16 QAM modulation density as shown in a block 1565.

Figure 16:
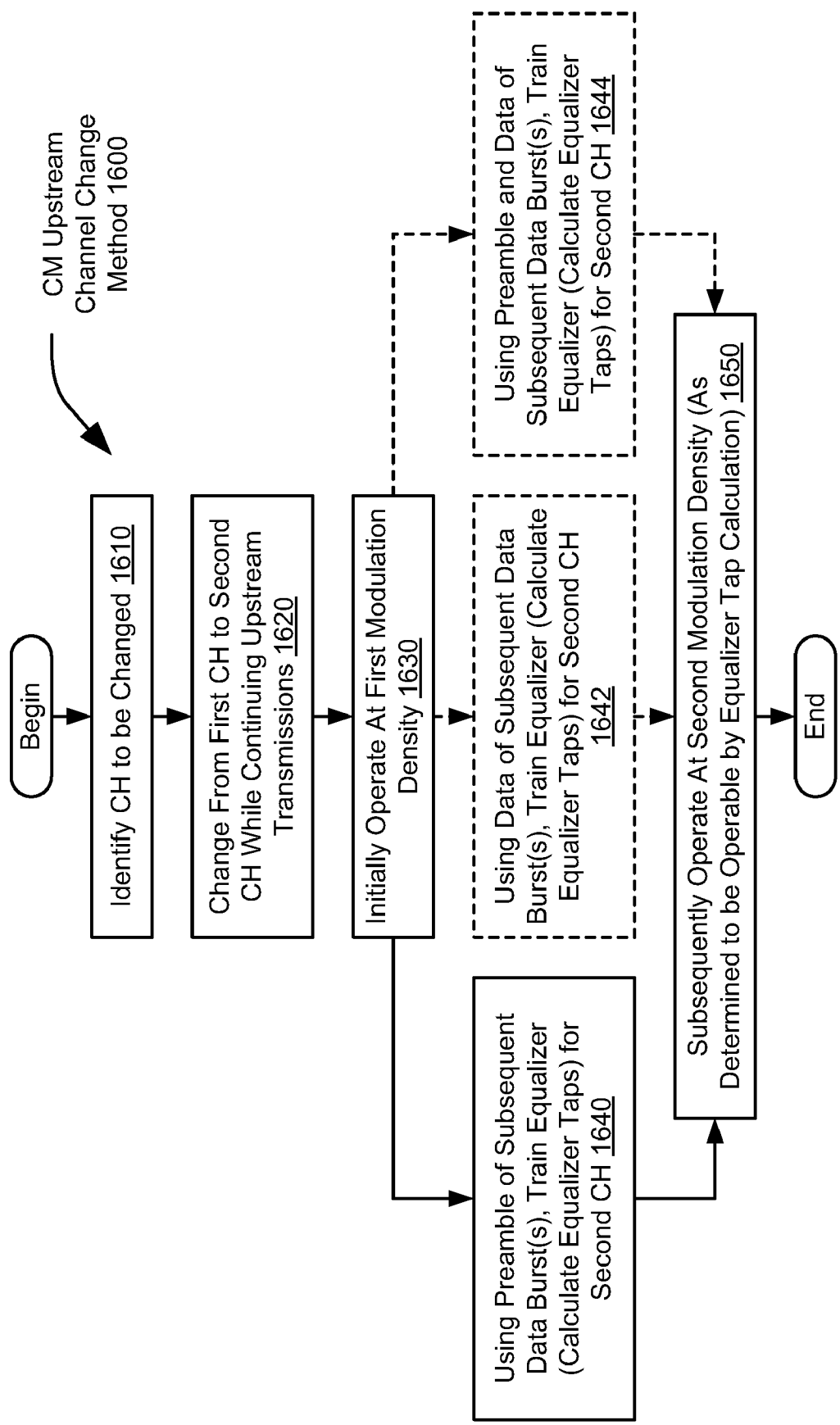
FIG. 16 is a flowchart illustrating another embodiment of a CM upstream channel change method that is performed according to the present invention.

FIG. 16 is a flowchart illustrating another embodiment of a CM upstream channel change method 1600 that is performed according to the present invention. In a block 1610, a channel is identified that is to be changed; the changing being made from a first channel to a second channel. Then, in a block 1620, upstream transmission is continued while performing the channel changing. Initially, as shown in a block 1630, the second channel is operated a first modulation density.

Then, as shown in a block 1640, the preamble of one or more of the subsequent data bursts on the second channel may be used to train an equalizer that is used for the second channel. That is to say, the equalizer taps are calculated using the preamble of one or more of the subsequent data bursts on the second channel. This equalizer tap calculation may be performed directly, as described above in various embodiments, or channel estimation may first be performed using the preamble and then that result may be used to perform the direct equalizer tap calculation in the block 1640. Then, as shown in a block 1650, the second channel is operated at a second modulation density that is determined to be operable based on the previous equalizer tap calculation.

In alternative embodiments, as shown in a block 1642, the data of one or more of the subsequent data bursts on the second channel may be used to train an equalizer that is used for the second channel. That is to say, the equalizer taps are calculated using the data of one or more of the subsequent data bursts on the second channel. This equalizer tap calculation may be performed directly, as described above in various embodiments, or channel estimation may first be performed using the data and then that result may be used to perform the direct equalizer tap calculation in the block 1642. Then, as shown in a block 1650, the second channel is operated at a second modulation density that is determined to be operable based on the previous equalizer tap calculation.

In even alternative embodiments, as shown in a block 1644, the preamble and data of one or more of the subsequent data bursts on the second channel may be used to train an equalizer that is used for the second channel. That is to say, the equalizer taps are calculated using the preamble and data of one or more of the subsequent data bursts on the second channel. This equalizer tap calculation may be performed directly, as described above in various embodiments, or channel estimation may first be performed using the data and then that result may be used to perform the direct equalizer tap calculation in the block 1642. Then, as shown in a block 1650, the second channel is operated at a second modulation density that is determined to be operable based on the previous equalizer tap calculation.

The FIG. 16 shows how a second channel, to which upstream data bursting has been changed from a first channel, may first be operated using a first modulation density and subsequently at a second modulation density after having undergone equalizer tap training (calculation of equalizer taps). The operations described with respect to the FIG. 16 may be performed in any of the various embodiments described within the patent application. The FIG. 16 may be viewed as being a method that is performed at a system level, at a CMTS level, at a CM level, or another level within any CM communication system that is built according to the present invention. The CM upstream channel change method 1600 may be viewed more generically as supporting the methodology of enhanced DOCSIS upstream channel changing according to the present invention using other devices in cooperation with a CMTS.

Figure 17:
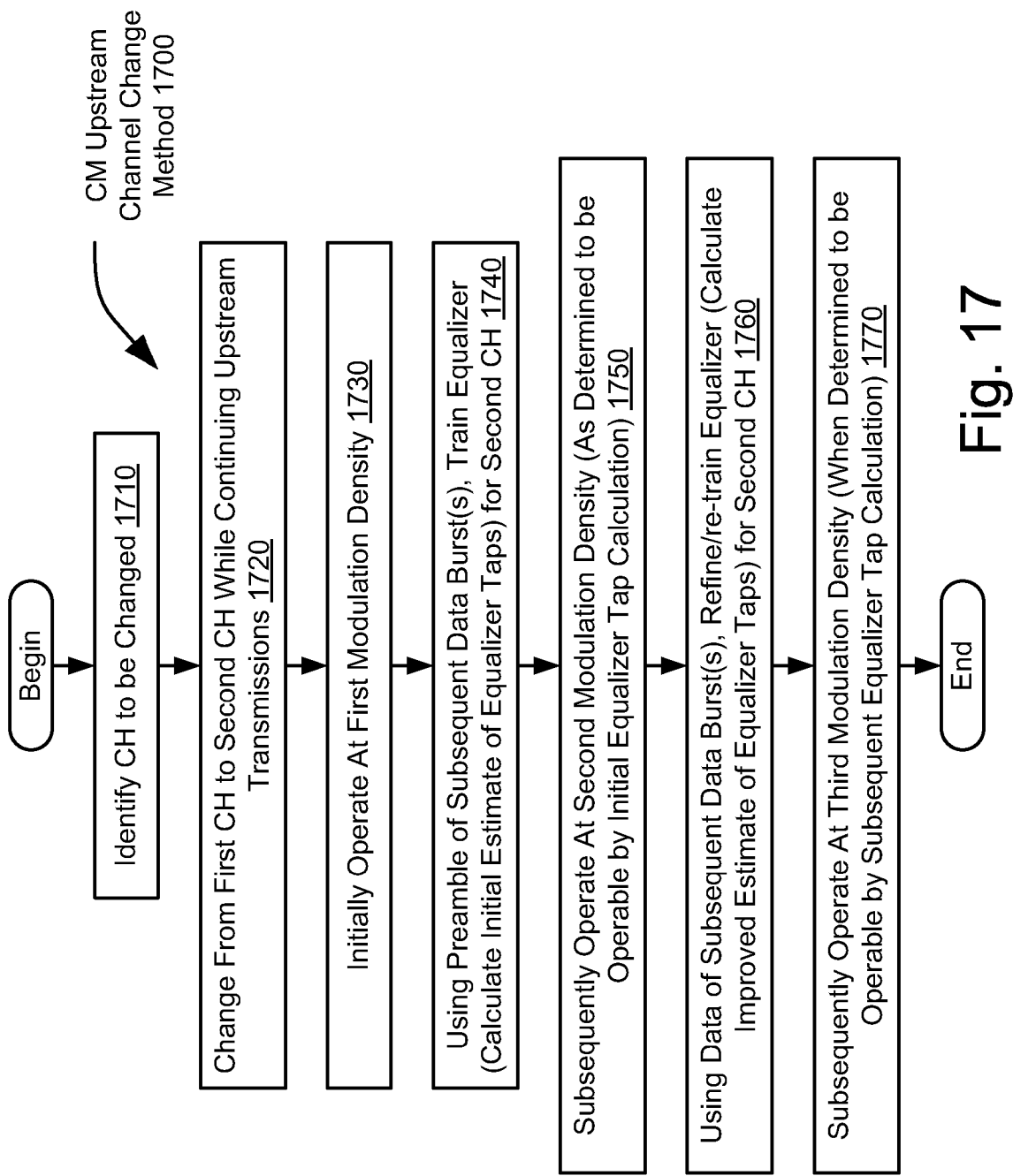
FIG. 17 is a flowchart illustrating another embodiment of a CM upstream channel change method that is performed according to the present invention.

FIG. 17 is a flowchart illustrating another embodiment of a CM upstream channel change method 1700 that is performed according to the present invention. In a block 1710, a channel is identified that is to be changed; the changing being made from a first channel to a second channel. Then, in a block 1720, upstream transmission is continued while performing the channel changing. Initially, as shown in a block 1730, the second channel is operated a first modulation density.

Then, as shown in a block 1740, the preamble of one or more of the subsequent data bursts on the second channel may be used to train an equalizer that is used for the second channel. That is to say, the equalizer taps are calculated using the preamble of one or more of the subsequent data bursts on the second channel. This equalizer tap calculation may be performed directly, as described above in various embodiments, or channel estimation may first be performed using the preamble and then that result may be used to perform the direct equalizer tap calculation in the block 1740. Then, as shown in a block 1750, the second channel is operated a second modulation density when it is determined to be operable based on the previous equalizer tap calculation.

Subsequently, as shown in a block 1760, the data of one or more of the subsequent data bursts on the second channel may be used to refine/re-train the equalizer that is used for the second channel. That is to say, an improved calculation/improved estimate of the equalizer taps are calculated using the data of one or more of the subsequent data bursts on the second channel. This improved equalizer tap calculation may be performed directly, as described above in various embodiments, or channel estimation may first be performed using the data and then that result may be used to perform the direct equalizer tap calculation in the block 1760. Then, as shown in a block 1770, the second channel is operated at a third modulation density when it is determined to be operable based on the previous, improved equalizer tap calculation.

The FIG. 17 shows how a second channel, to which upstream data bursting has been changed from a first channel, may first be operated using a first modulation density, subsequently at a second modulation density, and subsequently at a third modulation density after having undergone equalizer tap training (calculation of equalizer taps) and equalizer tap re-training (re-calculation of equalizer taps). The operations described with respect to the FIG. 17 may be performed in any of the various embodiments described within the patent application. The FIG. 17 may be viewed as being a method that is performed at a system level, at a CMTS level, at a CM level, or another level within any CM communication system that is built according to the present invention. The CM upstream channel change method 1700 may be viewed more generically as supporting the methodology of enhanced DOCSIS upstream channel changing according to the present invention using other devices in cooperation with a CMTS.

Figure 18:
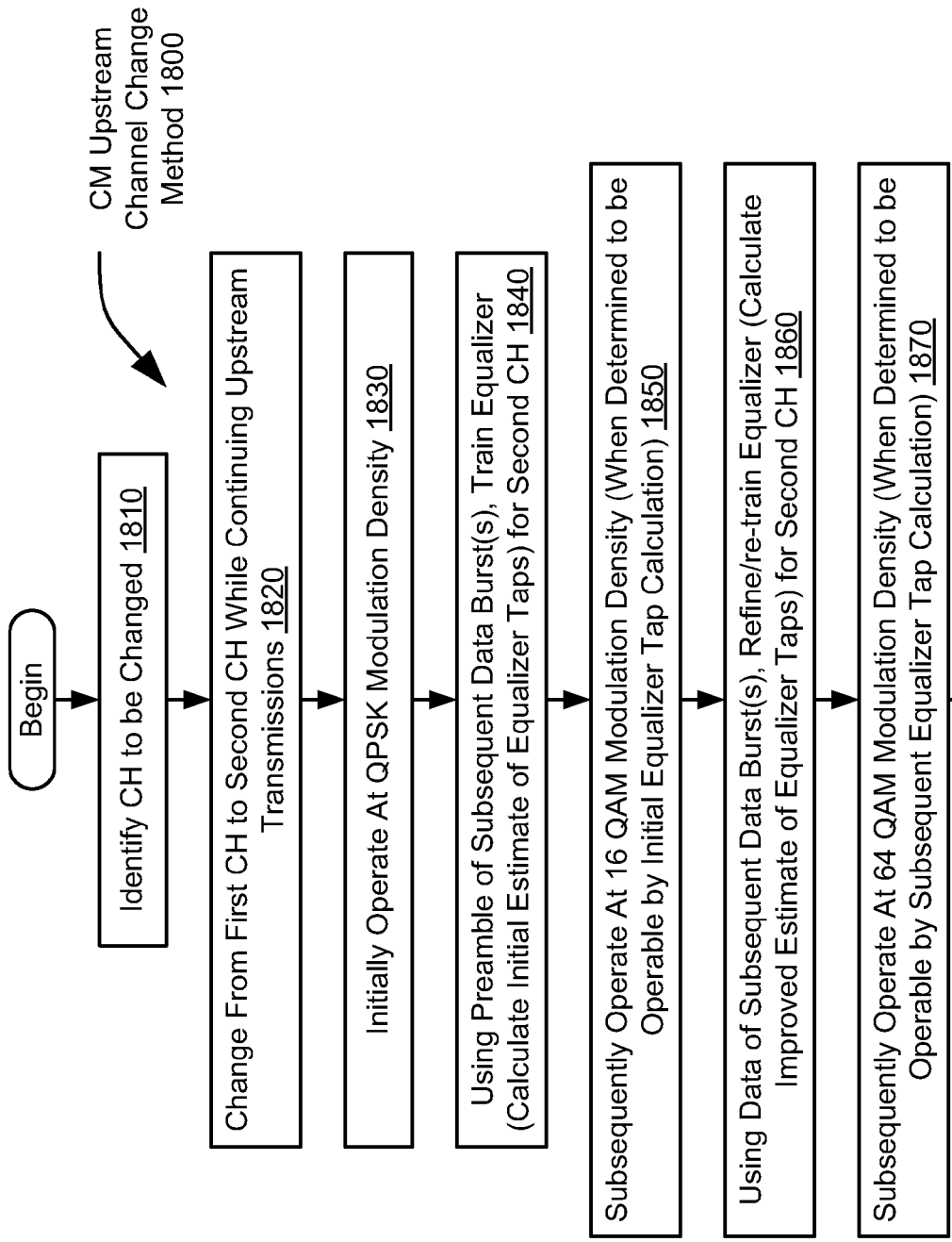
FIG. 18 is a flowchart illustrating another embodiment of a CM upstream channel change method that is performed according to the present invention.

FIG. 18 is a flowchart illustrating another embodiment of a CM upstream channel change method 1800 that is performed according to the present invention. In a block 1810, a channel is identified that is to be changed; the changing being made from a first channel to a second channel. Then, in a block 1820, upstream transmission is continued while performing the channel changing. Initially, as shown in a block 1830, the second channel is operated a QPSK modulation density.

Then, as shown in a block 1840, the preamble of one or more of the subsequent data bursts on the second channel may be used to train an equalizer that is used for the second channel. That is to say, the equalizer taps are calculated using the preamble of one or more of the subsequent data bursts on the second channel. This equalizer tap calculation may be performed directly, as described above in various embodiments, or channel estimation may first be performed using the preamble and then that result may be used to perform the direct equalizer tap calculation in the block 1840. Then, as shown in a block 1850, the second channel is operated a 16 QAM modulation density when it is determined to be operable based on the previous equalizer tap calculation.

Subsequently, as shown in a block 1860, the data of one or more of the subsequent data bursts on the second channel may be used to refine/re-train the equalizer that is used for the second channel. That is to say, an improved calculation/improved estimate of the equalizer taps are calculated using the data of one or more of the subsequent data bursts on the second channel. This improved equalizer tap calculation may be performed directly, as described above in various embodiments, or channel estimation may first be performed using the data and then that result may be used to perform the direct equalizer tap calculation in the block 1860. Then, as shown in a block 1870, the second channel is operated at a 64 QAM modulation density when it is determined to be operable based on the previous, improved equalizer tap calculation.

The FIG. 18 shows how a second channel, to which upstream data bursting has been changed from a first channel, may first be operated using a QPSK modulation density, subsequently at a 16 QAM modulation density, and subsequently at a 64 QAM modulation density after having undergone equalizer tap training (calculation of equalizer taps) and equalizer tap re-training (re-calculation of equalizer taps). The operations described with respect to the FIG. 18 may be performed in any of the various embodiments described within the patent application. The FIG. 18 may be viewed as being a method that is performed at a system level, at a CMTS level, at a CM level, or another level within any CM communication system that is built according to the present invention. The CM upstream channel change method 1800 may be viewed more generically as supporting the methodology of enhanced DOCSIS upstream channel changing according to the present invention using other devices in cooperation with a CMTS.

While within the embodiment of the FIG. 18, the first, second, and third modulation densities are shown as being QPSK, 16 QAM, and 64 QAM, respectively, those persons having skill in the art will also appreciate that any number of modulation densities may be used as well. For example, they may be in successively increasing higher order of modulation density such as the first, second, and third modulation densities being (QPSK, 16 QAM, 64 QAM as shown in FIG. 18), or (QPSK, 64 QAM, and 1024 QAM), or (16 QAM, 64 QAM, and 256 QAM).

Alternatively, the modulation densities may be in neither decreasing nor increasing order of modulation density such as the first, second, and third modulation densities are explicitly shown as being (QPSK, 64 QAM, and 16 QAM); this may be a situation where the subsequent calculation of equalizer taps indicates that a lower modulation density should be used (16 QAM in this case) rather than the higher 64 QAM that was initially determined to be operable using the initial calculation of the equalizer taps.

Those persons having skill in the art will appreciate the increasing modulation density as it is determined to be operable based in the equalizer tap calculations. In addition, the refining and improvement of the modulation density may continually be improved as it is determined to be possible upon further refinement, adjustment, and correction of the equalizer taps. Clearly, more that three modulation density transitions may also be performed without departing from the scope and spirit of the invention. If desired, whenever it is determined that a higher modulation density may be supported, as determined by ever-improved equalizer tap calculations in this embodiment, then the modulation density may move to that higher modulation density to provide for higher throughput within the system.

In view of the above detailed description of the invention and associated drawings, other modifications and variations will now become apparent to those skilled in the art. It should also be apparent that such other modifications and variations may be effected without departing from the spirit and scope of the invention.

What is claimed is:

1. A method for operating a multi-channel communication device, the method comprising:
transmitting data from a first communication device to a second communication device on a first channel in accordance with a first profile;
changing the data transmission from the first communication device to the second communication device from the first channel to a second channel;
continuing to transmit data from the first communication device to the second communication device on the second channel in accordance with a second profile;
after data transmission has been established on the second channel in accordance with the second profile, initializing and ranging the second channel; and
based on the initialization and ranging of the second channel, identifying a third profile for continued data transmission from the first communication device to the second communication device on the second channel in accordance with the third profile.

2. The method of claim 1, wherein:
the third profile is the second profile or the first profile.

3. The method of claim 1, wherein:
the third profile is selected based, at least in part, on information corresponding to prior data transmission between the first communication device and the second communication device on the second channel.

4. The method of claim 1, further comprising:
transmitting data from the first communication device to the second communication device on a third channel in accordance with the second profile.

5. The method of claim 1, further comprising:
while continuing to transmit data from the first communication device to the second communication device on the second channel in accordance with the second profile, continuing to transmit data from the first communication device to the second communication device on a third channel in accordance with a fourth profile; and wherein:
the second channel and the third channel form a dual channel.

6. The method of claim 1, wherein:
the second profile is selected from a plurality of initial profiles;
a first initial profile of the plurality of initial profiles accommodates shorter data bursts better than other initial profiles of the plurality of initial profiles;
a second initial profile of the plurality of initial profiles accommodates longer data bursts better than other initial profiles of the plurality of initial profiles; and
at least one initial profile of the plurality of initial profiles enables continued data transmission between the first communication device and the second communication device on the second channel without initially requiring initialization and ranging of the second channel.

7. The method of claim 1, wherein:
a frequency band employed to support communications between the first communication device and the second communication device is logically partitioned into the first channel and the second channel.

8. The method of claim 1, wherein:
the third profile is a higher order profile when compared to the second profile.

9. The method of claim 1, wherein:
the third profile includes a first modulation density;
the second profile includes a second modulation density; and
the first modulation density is a higher order modulation density when compared to the second modulation density.

10. The method of claim 1, wherein:
the first communication device is a cable modem; and
the second communication device is a cable modem termination system.

11. A method for operating a multi-channel communication device, the method comprising:
transmitting data from a first communication device to a second communication device on a first channel in accordance with a first profile;
establishing data transmission between the first communication device and the second communication device on at least one additional channel that includes a second channel;
continuing to transmit data from the first communication device to the second communication device on the at least one additional channel in accordance with at least a second profile;
after data transmission has been established on the at least one additional channel that includes the second channel in accordance with the at least the second profile, initializing and ranging the at least one additional channel that includes the second channel; and
based on the initialization and ranging of the at least one additional channel that includes second channel, identifying at least a third profile for continued data transmission from the first communication device to the second communication device on the at least one additional channel that includes the second channel in accordance with the at least the third profile.

12. The method of claim 11, wherein:
the at least the third profile is the at least the second profile or the first profile.

13. The method of claim 11, wherein:
the at least the third profile is selected based, at least in part, on information corresponding to prior data transmission between the first communication device and the second communication device on the at least one additional channel that includes the second channel.

14. The method of claim 11, wherein:
the at least one additional channel that includes the second channel also includes a third channel;
the establishing data transmission on at least one additional channel that includes the second channel includes:
establishing data transmission on the second channel; and
establishing data transmission on the third channel;
the continuing to transmit data from the first communication device to the second communication device on the at least one additional channel in accordance with the at least the second profile includes:
continuing to transmit data from the first communication device to the second communication device on the second channel in accordance with the second profile; and
transmitting data from the first communication device to the second communication device on the third channel in accordance with a fourth profile; and
the second channel and the third channel form a dual channel.

15. The method of claim 11, wherein:
the at least the second profile is selected from a plurality of initial profiles; and
at least one initial profile of the plurality of initial profiles provides sufficient robustness to ensure that data transmission may be supported between the first communication device and the second communication device on the at least one additional channel.

16. The method of claim 11, wherein:
the third profile is a higher order profile when compared to the second profile.

17. The method of claim 11, wherein:
the second communication device directs the first communication device to perform the changing of the data transmission between the first communication device and the second communication device on the at least one additional channel that includes the second channel.

18. The method of claim 11, wherein:
the first communication device is a cable modem; and
the second communication device is a cable modem termination system.

19. A communication device implemented to perform multi-channel communication with at least one additional communication device, the communication device comprising non-transitory computer readable media for implementing:
a transmitter module implemented to transmit data from the communication device to the at least one additional communication device on a first channel in accordance with a first profile, wherein:
the data transmission from the communication device to the at least one additional communication device is changed from the first channel to a second channel; and
the transmitter module continues to transmit data from the communication device to the at least one additional communication device on the second channel in accordance with a second profile;
an initializing and ranging module implemented to perform initializing and ranging of the second channel after data transmission has been established on the second channel in accordance with the second profile; and
wherein:
based on the initialization and ranging of the second channel, a third profile is identified and the transmitter module employs the third profile for continued data transmission from the communication device to the at least one additional communication device on the second channel in accordance with the third profile.

20. The communication device of claim 19, wherein:
as the transmitter module continues to transmit data from the communication device to the at least one additional communication device on the second channel in accordance with the second profile, the transmitter module also continues to transmit data from the communication device to the at least one additional communication device on a third channel in accordance with a fourth profile; and
the second channel and the third channel form a dual channel.

* * * * *